United States Patent
Zeiler et al.

(10) Patent No.: US 12,322,818 B2
(45) Date of Patent: Jun. 3, 2025

(54) CELL MODULE ASSEMBLIES AND METHODS OF MANUFACTURING CELL MODULE ASSEMBLIES

(71) Applicant: Briggs & Stratton, LLC, Wauwatosa, WI (US)

(72) Inventors: Jeffrey M. Zeiler, Brookfield, WI (US); James Michael Busse, Kenosha, WI (US); Jacob Schmalz, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 1 day.

(21) Appl. No.: 17/983,190

(22) Filed: Nov. 8, 2022

(65) Prior Publication Data
US 2023/0072285 A1    Mar. 9, 2023

Related U.S. Application Data

(63) Continuation of application No. 17/428,360, filed as application No. PCT/US2020/016523 on Feb. 4, 2020, now Pat. No. 11,588,202.
(Continued)

(51) Int. Cl.
| | |
|---|---|
| *H01M 50/213* | (2021.01) |
| *H01M 50/264* | (2021.01) |
| *H01M 50/502* | (2021.01) |
| *H01M 50/503* | (2021.01) |
| *H01M 50/512* | (2021.01) |

(52) U.S. Cl.
CPC ....... *H01M 50/213* (2021.01); *H01M 50/264* (2021.01); *H01M 50/502* (2021.01); *H01M 50/503* (2021.01); *H01M 50/512* (2021.01); *H01M 2220/20* (2013.01)

(58) Field of Classification Search
None
See application file for complete search history.

(56) References Cited

U.S. PATENT DOCUMENTS

| | | |
|---|---|---|
| 9,147,875 B1 | 9/2015 | Coakley et al. |
| 2006/0078789 A1 | 4/2006 | Wegner |

(Continued)

FOREIGN PATENT DOCUMENTS

| | | |
|---|---|---|
| JP | 2018-092826 A | 6/2018 |
| JP | 2018-106796 A | 7/2018 |

(Continued)

*Primary Examiner* — Jonathan G Leong
*Assistant Examiner* — Tony S Chuo
(74) *Attorney, Agent, or Firm* — Foley & Lardner LLP

(57) ABSTRACT

A cell module assembly includes a first frame having a first plurality of pockets, a second frame spaced apart from the first frame and having a second plurality of pockets, a plurality of lithium-ion battery cells coupled to and extending between the second frame and the first frame, a first collector plate electrically connected to the plurality of lithium-ion battery cells and coupled to the first frame by a first curable adhesive, and a second collector plate electrically connected to the plurality of lithium-ion battery cells and coupled to the second frame by a second curable adhesive. Each one of the plurality of lithium-ion battery cells is received within a respective one of the first plurality of pockets and a respective one of the second plurality of pockets.

8 Claims, 17 Drawing Sheets

Related U.S. Application Data

(60) Provisional application No. 62/801,186, filed on Feb. 5, 2019.

(56) References Cited

U.S. PATENT DOCUMENTS

| | | |
|---|---|---|
| 2009/0104516 A1 | 4/2009 | Yoshihara et al. |
| 2009/0274952 A1 | 11/2009 | Wood et al. |
| 2012/0094153 A1 * | 4/2012 | Fuller |
| 2014/0154539 A1 * | 6/2014 | Kwok ................ H01M 50/244 |
| | | 429/82 |
| 2014/0322582 A1 | 10/2014 | Ruter et al. |
| 2015/0145482 A1 | 5/2015 | Hurng et al. |
| 2016/0149174 A1 | 5/2016 | Okura |
| 2017/0373287 A1 | 12/2017 | Yamashita et al. |
| 2018/0191040 A1 | 7/2018 | Mastrandrea et al. |
| 2019/0075724 A1 | 3/2019 | Becke et al. |

FOREIGN PATENT DOCUMENTS

| | | |
|---|---|---|
| WO | WO-2018/161324 A1 | 9/2018 |
| WO | WO-2019/001303 | 1/2019 |

\* cited by examiner

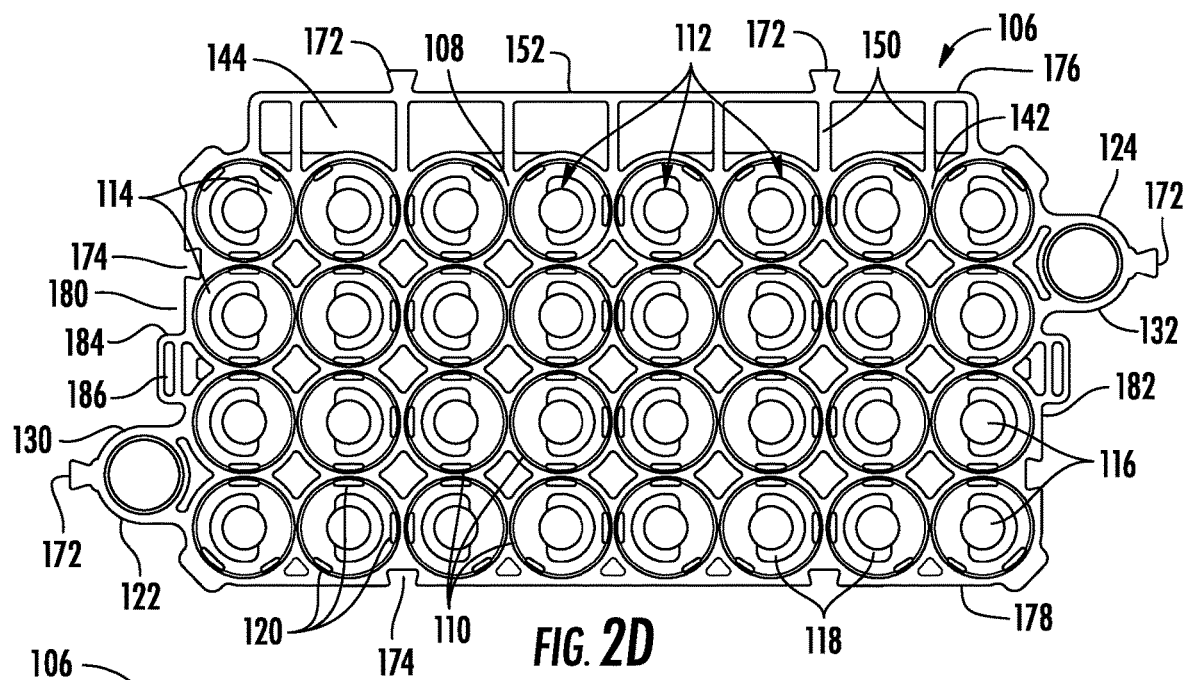
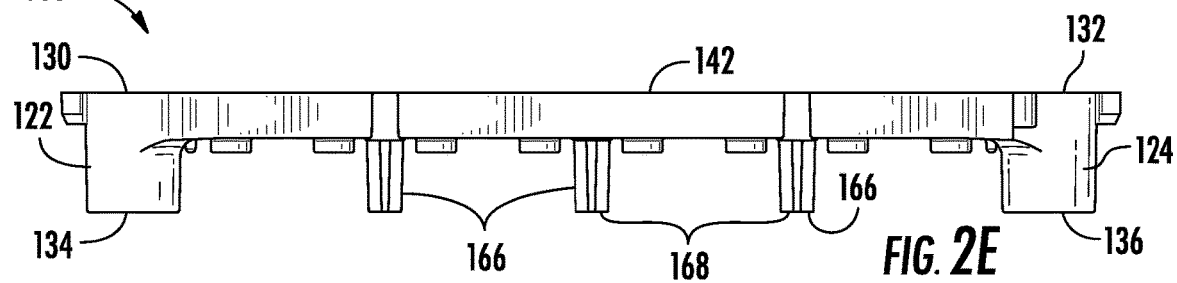
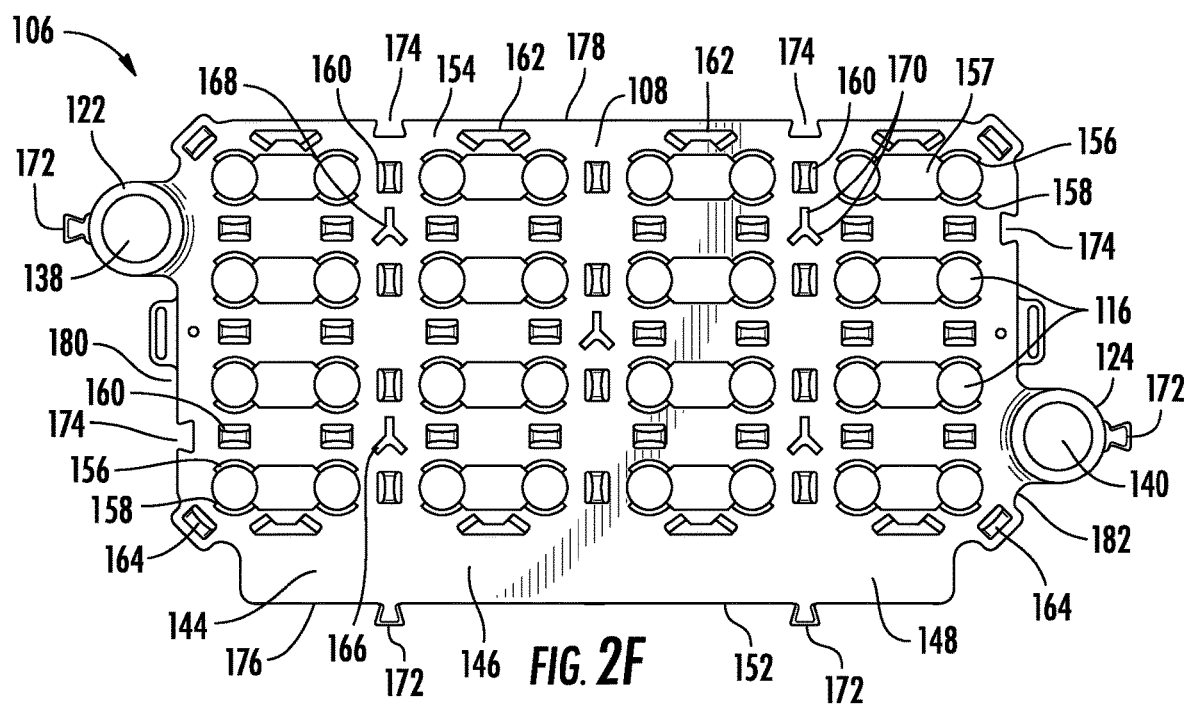

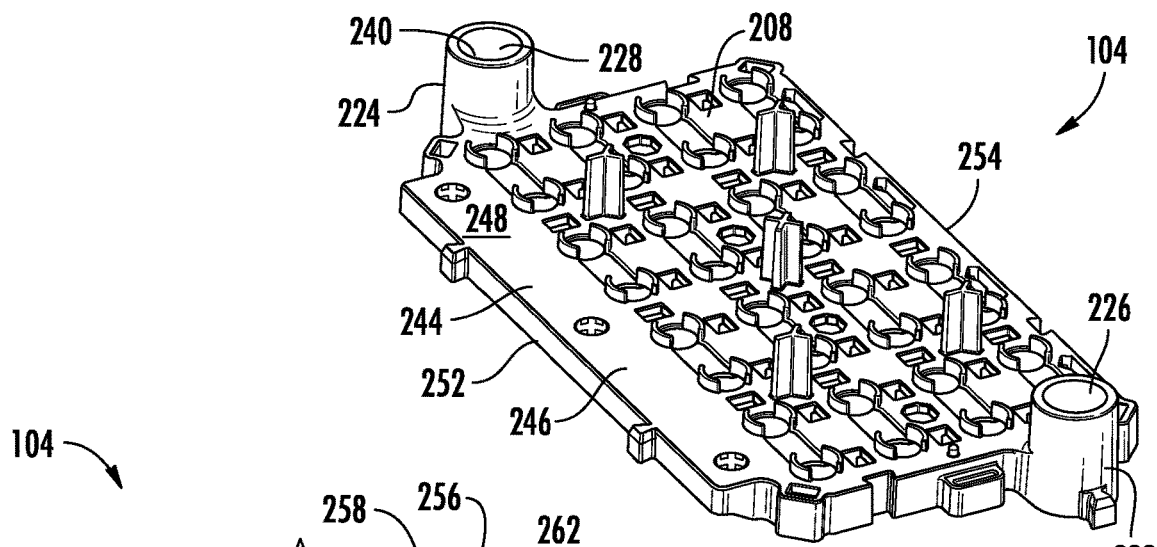
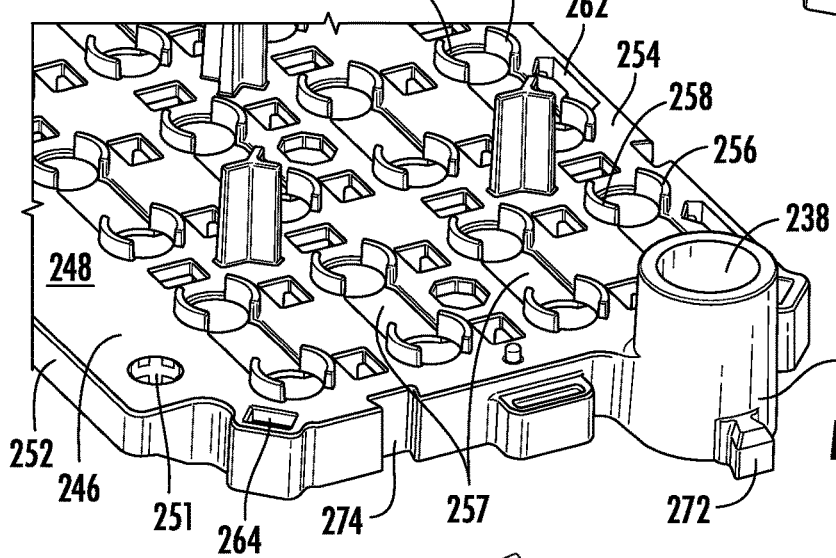
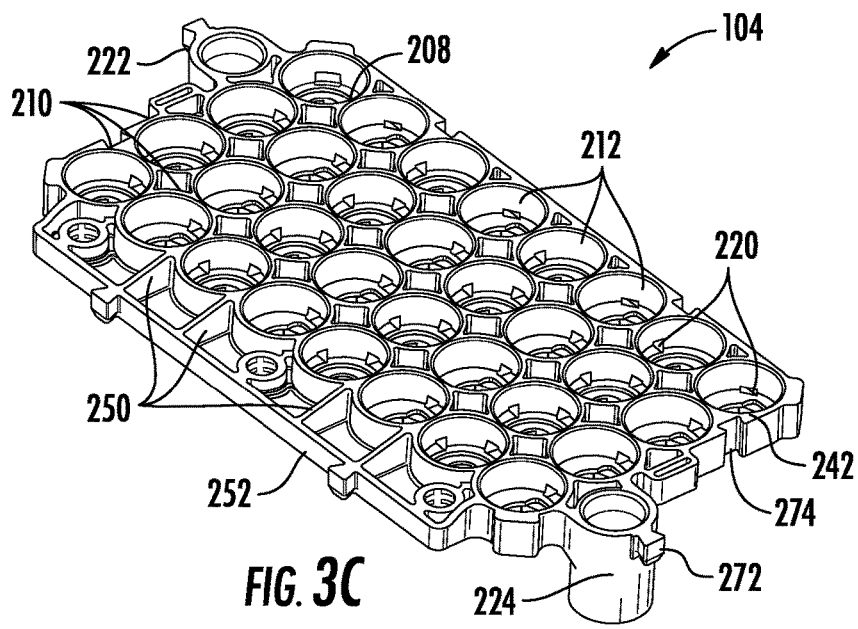

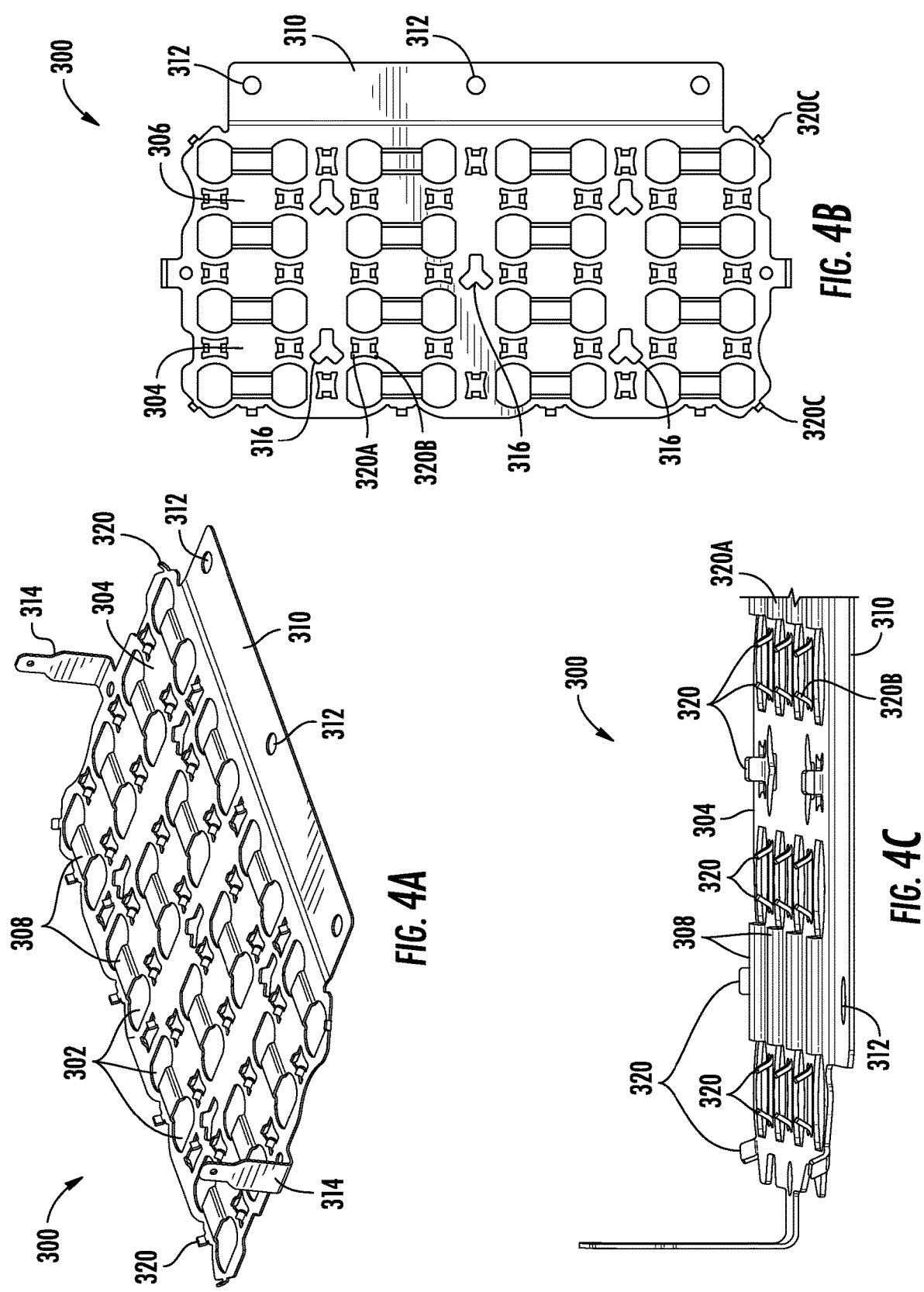

CELL MODULE ASSEMBLIES AND METHODS OF MANUFACTURING CELL MODULE ASSEMBLIES

CROSS-REFERENCE TO RELATED APPLICATIONS

This application is continuation of U.S. patent application Ser. No. 17/428360, filed on Aug. 4, 2021, which a National Stage Application of International Application No. PCT/US2020/016523, filed Feb. 4, 2020, which claims the benefit of U.S. Provisional Application No. 62/801,186, filed Feb. 5, 2019, the contents of which are incorporated herein by reference in their entireties.

BACKGROUND

Battery packs may be used with different types of equipment, including outdoor power equipment, vehicles, aerial man lifts, floor care devices, golf carts, lift trucks and other industrial vehicles, floor care devices, recreational utility vehicles, industrial utility vehicles, lawn and garden equipment, and energy storage or battery backup systems. Outdoor power equipment includes lawn mowers, riding tractors, snow throwers, pressure washers, portable generators, tillers, log splitters, zero-tum radius mowers, walk-behind mowers, riding mowers, and turf equipment such as spreaders, sprayers, seeders, rakes, and blowers. Outdoor power equipment may, for example, use one or more electric motors to drive an implement, such as a rotary blade of a lawn mower, a pump of a pressure washer, the auger of a snow thrower, the alternator of a generator, and/or a drivetrain of the outdoor power equipment. Vehicles include cars, trucks, automobiles, motorcycles, scooters, boats, all-terrain vehicles (ATVs), personal water craft, snowmobiles, utility vehicles (UTVs), and the like.

SUMMARY

The present disclosure relates generally to battery packs that can be used to provide electrical power to vehicles and other equipment. More specifically, the present disclosure relates to the design and manufacture of cell module assemblies for use in battery packs.

In one embodiment, a cell module assembly is provided. The cell module assembly includes a top frame, a bottom frame spaced apart from the top frame, multiple lithium-ion battery cells, a top collector plate, a bottom collector plate, and curable adhesive. The top frame has protrusions extending away from the top frame to define first multiple pockets. The bottom frame also has protrusions extending away from the bottom frame toward the top frame to define second multiple pockets. The second multiple pockets includes pockets axially aligned with the first multiple pockets. The multiple lithium-ion battery cells are each adhesively coupled to the bottom frame and the top frame. The multiple lithium-ion battery cells extend between the bottom frame and top frame. The multiple lithium-ion battery cells are each received within a pocket in the first multiple pockets and a pocket in the second multiple pockets. The multiple lithium-ion battery cells are connected in parallel. The top collector plate is electrically connected to the multiple lithium-ion battery cells and is adhesively coupled to the top frame. The top collector plate defines first multiple apertures above the first multiple pockets. The bottom collector plate is electrically connected to the multiple lithium-ion battery cells and is adhesively coupled to the bottom frame. The bottom collector plate defines second multiple apertures below the second multiple pockets. The curable adhesive is received within each window in the first multiple pockets. The curable adhesive contacts the top frame and each of the multiple lithium-ion battery cells in at least two separate locations to adhesively couple each lithium-ion battery cell to the top frame.

In another embodiment, a cell module assembly includes a top frame, a bottom frame, multiple lithium-ion battery cells, a top collector plate, a bottom collector plate, and a compression limiter. The top frame defines a first multiple pockets and includes a first collar formed on an outer perimeter of the top frame. The bottom frame is spaced apart from the top frame and defines a second multiple pockets axially aligned with the first multiple pockets. The bottom frame includes a second collar formed on an outer perimeter of the bottom frame and axially aligned with the first collar. Each of the multiple lithium-ion battery cells are coupled to and extend between the bottom frame and the top frame. Each of the multiple lithium-ion battery cells are received within a pocket in the first multiple pockets and a pocket in the second multiple pockets. The top collector plate is electrically connected to the multiple lithium-ion battery cells and is coupled to the top frame. The bottom collector plate is electrically connected to the multiple lithium-ion battery cells and is coupled to the bottom frame. The compression limiter is received within and extends between the first collar and the second collar.

In another embodiment, the cell module assembly includes a first frame, a second frame, multiple lithium-ion battery cells, a first collector plate, and a second collector plate. The first frame defines a first multiple pockets. The first frame has an outer perimeter including mating tabs extending outward from the outer perimeter and mating notches extending inward from the outer perimeter. The second frame is spaced apart from the first frame and defines a second multiple pockets axially aligned with the first multiple pockets. Each of the multiple lithium-ion battery cells are coupled to and extend between the second frame and the first frame. Each of the multiple lithium-ion battery cells are received within a pocket in the first multiple pockets and a pocket in the second multiple pockets. The first collector plate is electrically connected to the multiple lithium-ion battery cells and is coupled to the first frame. The second collector plate is electrically connected to the multiple lithium-ion battery cells and is coupled to the second frame.

In some embodiments, the cell module assembly includes a battery monitoring system including a sensor for monitoring lithium-ion battery use and a controller for determining lithium-ion battery useful life. In some embodiments, the cell module assembly omits fasteners.

The cell module assemblies can include mating features that allow several cell module assemblies to be coupled together to form a battery pack. For example, two or more cell module assemblies are electrically connected together and installed into a vehicle or other equipment. Cell module assemblies can be connected in series or in parallel, and can be stacked vertically or horizontally relative to another cell module assembly to provide a desired amount of power to a vehicle or piece of equipment.

In another embodiment, a method of assembling a cell module assembly is provided. The method includes positioning a lithium-ion battery cell within a first pocket formed in a top frame and within a second pocket formed in a bottom frame opposite the top frame. The method includes coupling a top collector plate to the top frame above the lithium-ion battery cell and coupling a bottom collector plate to the bottom frame below the lithium-ion battery cell. Adhesive is then applied to the bottom collector plate and into a plurality of passages formed in the bottom collector plate. The passages formed in the bottom collector plate allow adhesive to pass beyond the bottom collector plate, onto the bottom frame, and into the second pocket through at least two windows offset by at least 90 degrees. The adhesive then contacts the lithium-ion battery cell in at least two separate directions. The adhesive is then cured. Next, adhesive is applied to the top collector plate and into a plurality of passages formed in the top collector plate. The passages formed in the top collector plate allow adhesive to pass beyond the top collector plate, onto the top frame, and into the first pocket through at least two windows angularly offset by at least 90 degrees. The adhesive then contacts the lithium-ion battery cell in at least two separate directions. Next, the adhesive is cured.

In another embodiment, a cell module assembly includes a first frame having a first plurality of pockets, a second frame spaced apart from the first frame and having a second plurality of pockets, a plurality of lithium-ion battery cells coupled to and extending between the second frame and the first frame, a first collector plate electrically connected to the plurality of lithium-ion battery cells and coupled to the first frame by a first curable adhesive, and a second collector plate electrically connected to the plurality of lithium-ion battery cells and coupled to the second frame by a second curable adhesive. Each one of the plurality of lithium-ion battery cells is received within a respective one of the first plurality of pockets and a respective one of the second plurality of pockets.

In another embodiment, a cell module assembly includes a first frame defining a first plurality of pockets and a second frame spaced apart from the first frame and defining a second plurality of pockets. The first frame includes a first collar extending outwardly from an outer perimeter of the first frame. The second frame includes a second collar extending outwardly from an outer perimeter of the second frame. The first collar being axially aligned with the second collar. The cell module assembly further includes a plurality of lithium-ion battery cells coupled to and extending between the second frame and the first frame, a first collector plate electrically connected to the plurality of lithium-ion battery cells and coupled to the first frame, a second collector plate electrically connected to the plurality of lithium-ion battery cells and coupled to the second frame, and a compression rod received within and extending between the first collar and the second collar. Each one of the plurality of lithium-ion battery cells is received within a respective one of the first plurality of pockets and a respective one of the second plurality of pockets.

In another embodiment, a cell module assembly includes a first frame defining a first plurality of pockets and a second frame spaced apart from the first frame and defining a second plurality of pockets. The first frame includes an outer perimeter having one or more mating tabs extending outwardly from the outer perimeter and one or more mating notches extending inwardly into the outer perimeter. The cell module assembly further includes a plurality of lithium-ion battery cells coupled to and extending between the second frame and the first frame, a first collector plate electrically connected to the plurality of lithium-ion battery cells and coupled to the first frame, and a second collector plate electrically connected to the plurality of lithium-ion battery cells and coupled to the second frame. Each one of the plurality of lithium-ion battery cells is received within a respective one of the first plurality of pockets and a respective one of the second plurality of pockets.

Alternative exemplary embodiments relate to other features and combinations of features as may be generally recited in the claims.

BRIEF DESCRIPTION OF THE DRAWINGS

FIG. 2D is a top view of the bottom frame of FIG. 2A.

FIG. 2E is a front view of the bottom frame of FIG. 2A.

FIG. 2F is a bottom view of the bottom frame of FIG. 2A.

FIG. 3A is a top perspective view of a top frame of the cell module assembly of FIG. 1.

FIG. 3B is a detailed view of locating and mounting features present in the top frame of FIG. 3A.

FIG. 3C is a bottom perspective view of the top frame of FIG. 3A.

FIG. 4A is a top perspective view of a bottom collector plate of the cell module assembly of FIG. 1.

FIG. 4B is a bottom view of the bottom collector plate of FIG. 4A.

FIG. 4C is a top, front perspective view of the bottom collector plate of FIG. 4A.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
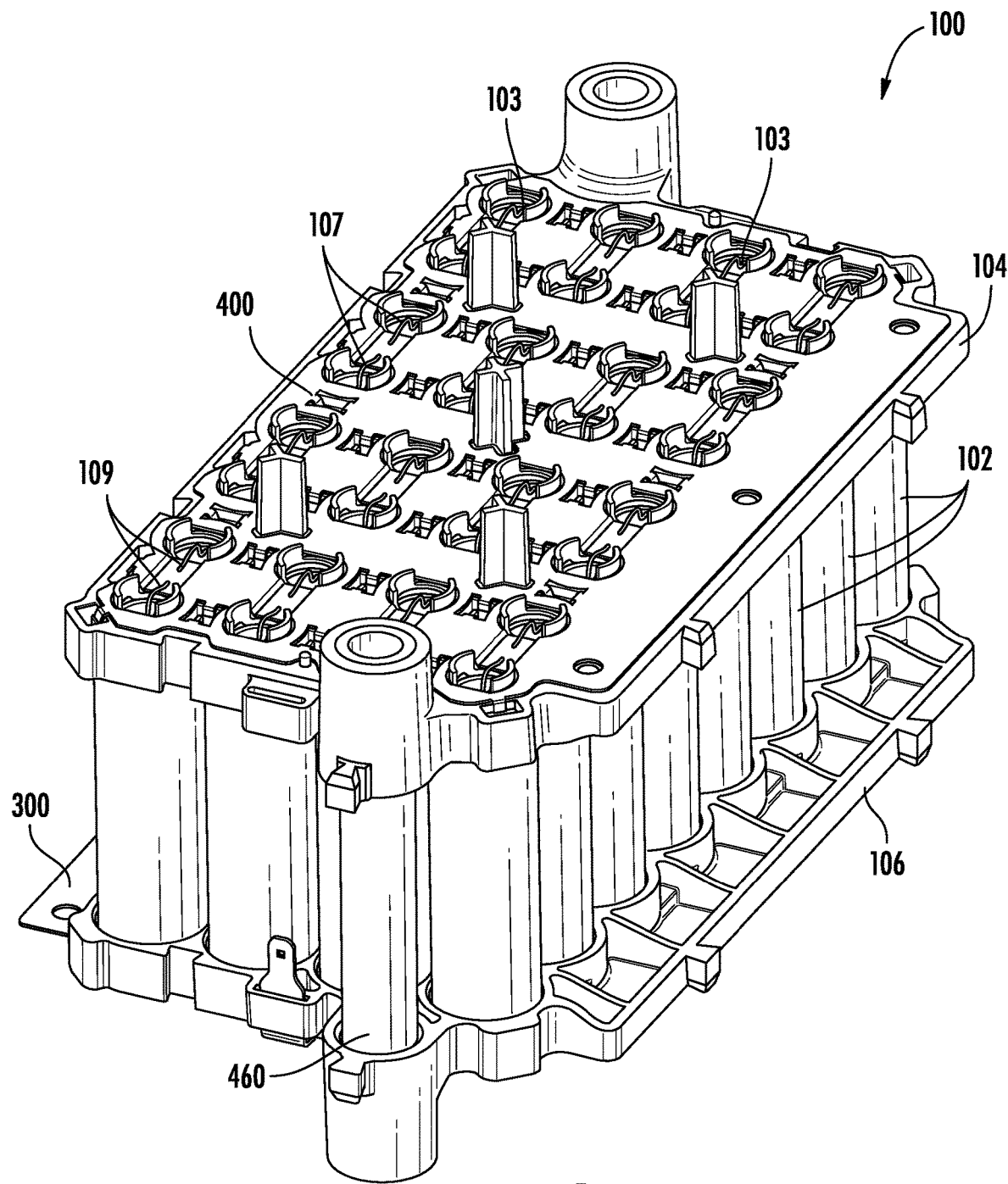
FIG. 1 is a perspective view of a cell module assembly according to embodiments of the disclosure.
Figure 2A:
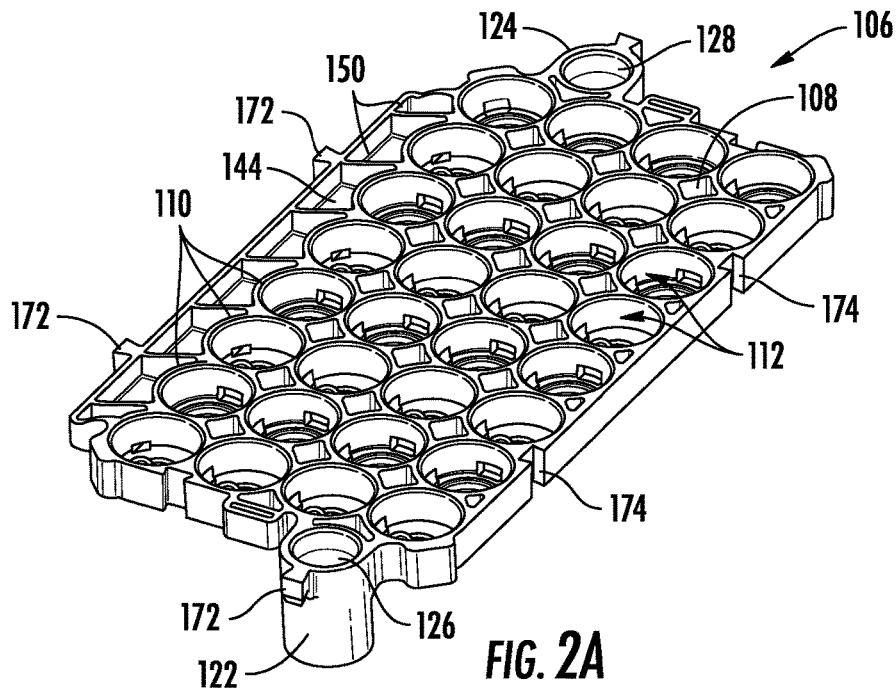
FIG. 2A is a top perspective view of a bottom frame of the cell module assembly of FIG. 1.
Figure 2B:
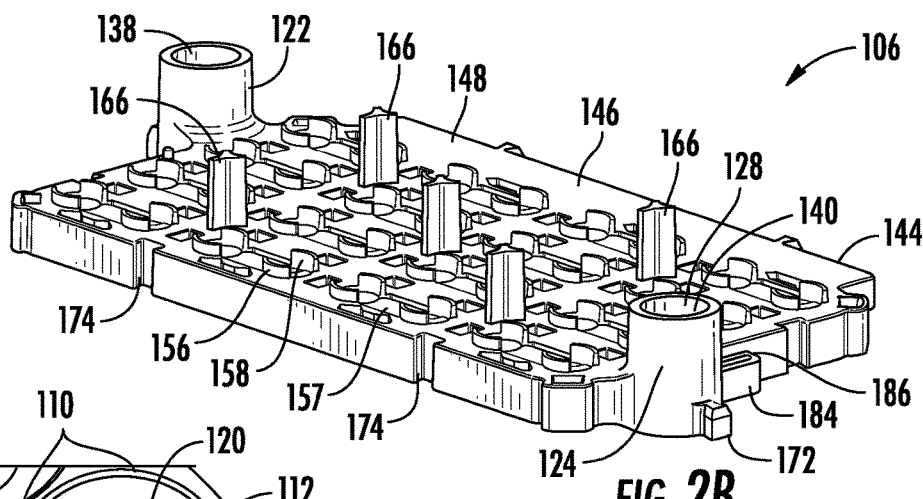
FIG. 2B is a bottom perspective view of the bottom frame of FIG. 2A.
Figure 2C:
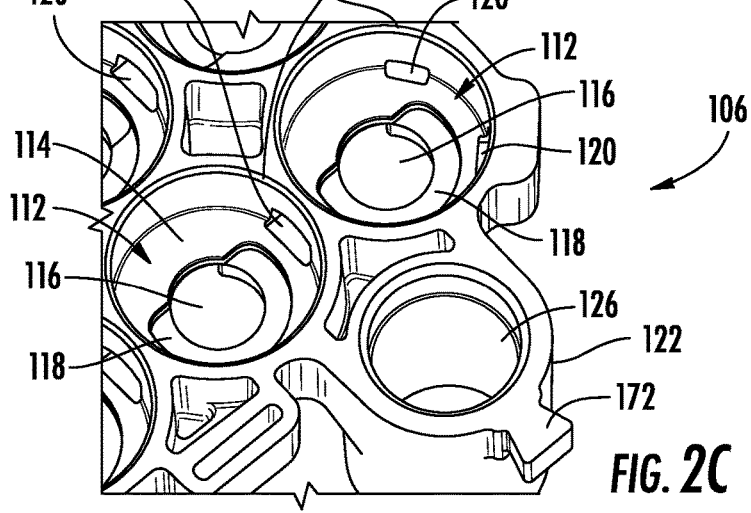
FIG. 2C is a detailed view of pockets and a collar formed in the bottom frame of FIG. 2A.
Figure 3D:
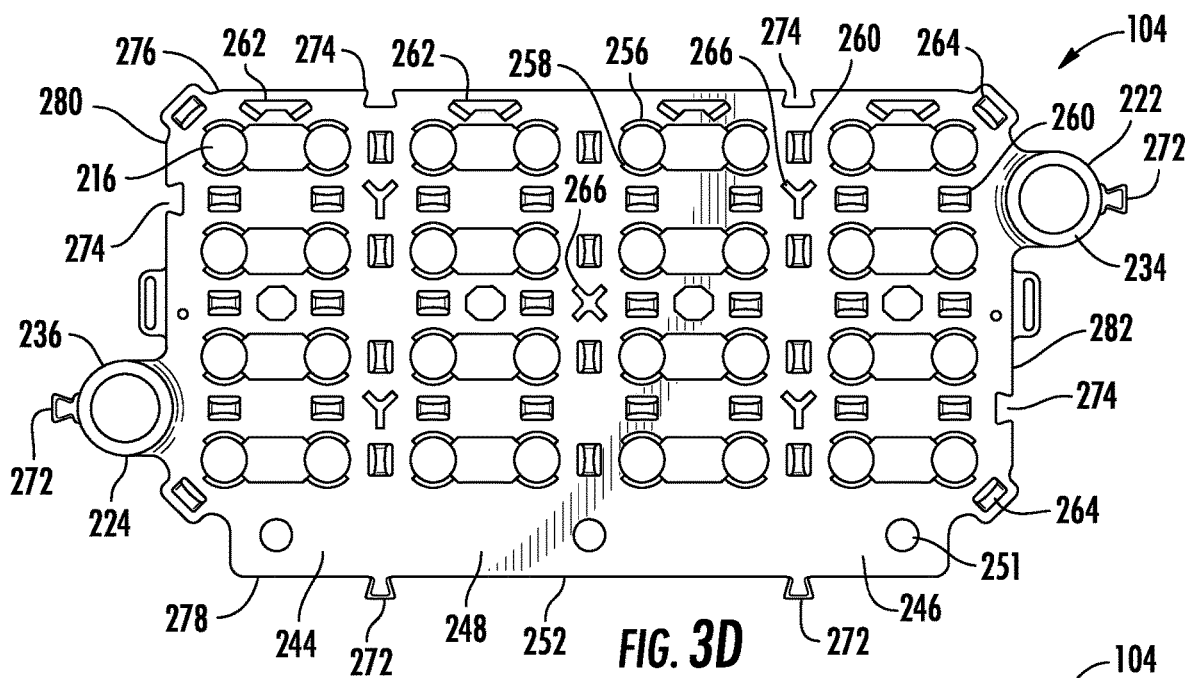
FIG. 3D is a top view of the top frame of FIG. 3A.
Figure 3E:
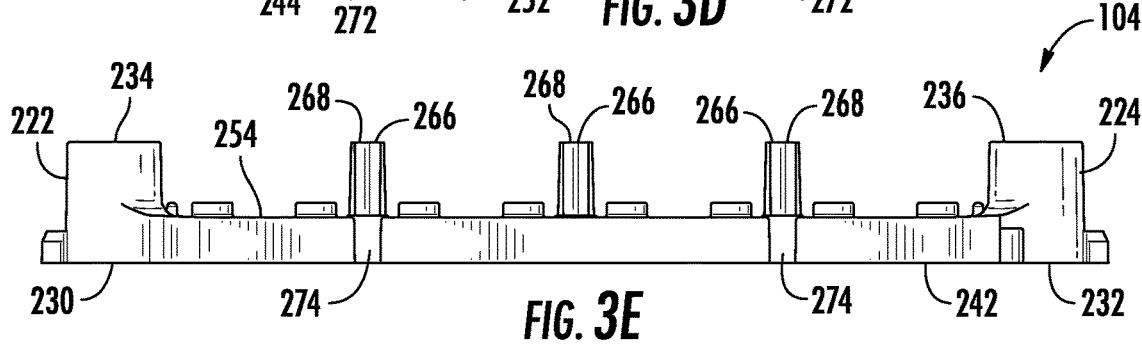
FIG. 3E is a front view of the top frame of FIG. 3A.
Figure 3F:
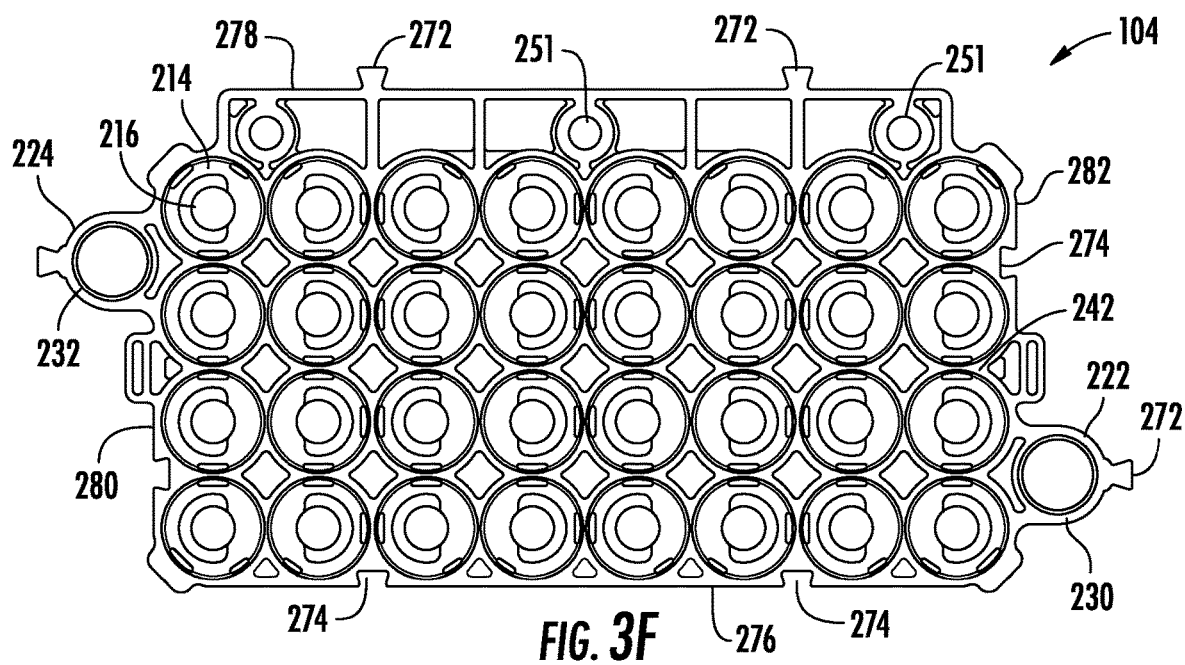
FIG. 3F is a bottom view of the top frame of FIG. 3A.

Referring to FIG. 1, a cell module assembly ("CMA") 100 is illustrated according to an exemplary embodiment of the disclosure. The CMA 100 includes multiple battery cells 102, which can together output power to operate a vehicle or other equipment. In some embodiments, the battery cells 102 are lithium-ion battery cells. The battery cells 102 can be lithium-ion battery cells rated at 3.6 volts and 3 amp-hours, for example. As illustrated, the CMA 100 includes thirty-two battery cells 102 arranged in four rows of eight cells each. The battery cells 102 are electrically connected to one another using conducting wires 107 having terminals 103, 105, 109 coupled (e.g., wire bonded) to each battery cell 102 and a common conductor (e.g., a top collector plate 400 or bottom collector plate 300). The CMA 100 can be identified with an individual identifier (e.g., serial number, bar code, etc.) for use by the CMA manufacturer to track, categorize, evaluate, or record information or data about an individual CMA.

The battery cells 102 are supported by a top frame 104 and a bottom frame 106. The top frame 104 and the bottom frame 106 can each be continuous components formed of insulating polymeric materials. As shown in FIGS. 2A-2F, the bottom frame 106 includes a generally rectangular base 108 including a series of cylindrical protrusions 110 extending upwardly away from the base 108. The cylindrical protrusions 110 define a series of pockets 112 that can each receive a battery cell 102, for example. Each pocket 112 can include a generally circular base 114 circumscribed by the cylindrical protrusion 110 associated with the pocket 112. In some embodiments, a terminal hole 116 is formed through the base 114. The terminal hole 116 can be approximately centered within the base 114 to allow a terminal (e.g., terminal 103, 105, shown in FIG. 6) of a battery cell 102 to extend through the bottom frame 106. Alternatively, the terminal 103, 105 may be entirely contained within the pocket 112, and the terminal hole 116 allows access to the terminal 103, 105, as shown in FIG. 7E. Access to the terminal 103, 105 or the battery cell 102, generally, can be helpful in assembly and/or maintenance processes where wire bonds between the terminals 103, 105 and battery cells 102 are being created or repaired. In some examples, the base 114 includes a sunken section 118 surrounding a portion of the terminal hole 116. The sunken section 118 can extend around more than half of the terminal hole 116, for example. Windows 120 can be formed in the base 114 and/or the cylindrical protrusions 110 to define adhesive flow paths through the bottom frame 106 onto the battery cells 102 positioned within the pockets 112, as explained in additional detail below.

Collars 122, 124 can be positioned about the outer perimeter of the generally rectangular base 108. In some examples, the collars 122, 124 are positioned on opposite sides of the bottom frame 106. The collars 122, 124 can each have a cylindrical inner wall 126, 128 extending from a first axial end surface 130, 132 of the collars 122, 124 to a second axial end surface 134, 136 of the collars 122, 124. The cylindrical inner walls 126, 128 each define a bore 138, 140. In some embodiments, the first axial end surface 130, 132 extends approximately parallel to an uppermost surface 142 of the bottom frame 106. The uppermost surface 142 can correspond with an uppermost surface of each cylindrical protrusion 110, for example. In some embodiments, the first axial end surfaces 130, 132 and the uppermost surface 142 of the bottom frame 106 form a continuous planar surface.

A spacer 144 can extend outward from one side of the bottom frame 106. In some embodiments, the spacer 144 extends away from an outermost set of pockets 112 to form a platform 146 having a generally planar bottom surface 148. Ribs 150 can extend from the cylindrical protrusions 110 outward to an outer platform surface 152 to provide additional support to the platform 146, or to provide a flange for mounting or support purposes.

The bottom surface 154 of the bottom frame 106 can include a series of locating features 156, 158 that protrude away from the bottom surface 154. In some embodiments, the locating features 156, 158 are grouped in pairs of two distinct and spaced apart walls surrounding each terminal hole 116 in the bottom frame 106. The locating features 156, 158 can have an arcuate shape defined by an identical radius, and can be positioned concentric with the terminal hole 116. The locating features 156, 158 can be used to help locate a bottom collector plate (300, shown in FIG. 4A-4C) and shield terminal connections between terminals of the battery cells 102 and the bottom collector plate 300, as explained below. In some embodiments, the locating features 156, 158 can be arranged in groups of two, and a groove 157 formed into the bottom surface 154 can extend between each pair of locating features 156, 158.

The bottom surface 154 includes recesses formed into the bottom frame 106 to define adhesive flow paths. The recesses can direct adhesive around battery cells 102 during the CMA assembly process (e.g., the CMA assembly process 500), which can help create a robust coupling between battery cells 102 and the bottom frame 106. For example, mounting holes 160 can be formed through the bottom frame 106. In some embodiments, the mounting holes 160 are aligned to straddle two adjacent pockets. The mounting holes 160 can define the windows 120 formed in the cylindrical protrusions 110 and/or bases 114 discussed above. The outermost pockets 112 formed in the bottom frame 106 can be surrounded by additional recesses, including channels 162 and trenches 164. The channels 162 can extend between multiple pockets 112, and can extend to windows 120 formed in two different cylindrical protrusions 110 or bases 114. The trenches 164 can be positioned near the outermost pockets 112 in the pocket array. Each of the recesses can be oriented to direct adhesive radially inward into each pocket 112, in a direction generally normal to the cylindrical protrusions 110.

One or more supports 166 can extend away from the bottom surface 154 of the bottom frame 106. The supports 166 can be spaced about the bottom frame 106 and positioned to more evenly distribute loading experienced by the bottom frame 106 (e.g., from battery cell weight 102, additional CMA's, etc.) throughout the component. In some examples, the supports extend away from the bottom surface 154 of the bottom frame 106 to a support surface 168 extending approximately planar with the second axial end surfaces 134, 136 of the collars 122, 124. The supports 166 can include one or more legs 170 to provide balance.

The bottom frame 106 can include a combination of mating tabs 172 and mating notches 174 positioned about the outer perimeter of the base 108. In some examples, mating tabs 172 are formed on a first side 176 of the base 108 and extend outwardly away from the base 108, while mating notches 174 are formed into a second side 178 of the base 108 opposite the first side 176 and extend into the outer perimeter of the base 108. The mating tabs 172 and mating notches 174 can have a complimentary geometry (e.g., the mating tabs 172 can be received within the mating notches 174 to form a coupling). Each of the mating tabs 172 may taper outwardly as the tab 172 extends away from the base 108. Similarly, each of the mating notches 174 may taper outwardly as the mating notch 174 extends into the base 108. The third side 180 and the fourth side 182 can each include a mating tab 172 and a mating notch 174. In some embodiments, a mating tab 172 extends outwardly away from each of the collars 122, 124. Optionally, flanges 184 including slots 186 can extend away from the third and fourth sides 180, 182, collectively.

The top frame 104 of the CMA 100, as shown in FIGS. 3A-3F, can include many of the same features present in the bottom frame 106 that were previously discussed above. Because the top frame 104 can even be a substantial mirror image of the bottom frame 106 in some embodiments, components present in the top frame 104 having common names in both the bottom frame 106 and the top frame 104 should be considered to have the same or substantially similar geometries, orientations, structures, or relationships to other components as described above with reference to the bottom frame 106, unless specified otherwise. For brevity, some of the description of like components having like names present in both the bottom frame 106 and the top frame 104 has been omitted, but should be considered to be incorporated herein by reference in its entirety.

As shown in FIGS. 3A-3F, the top frame 104 also includes a generally rectangular base 208. A series of cylindrical protrusions 210 extend upwardly away from the base 208 to define another series of pockets 212 that can each receive a battery cell 102. Each pocket 212 can include a generally circular base 214 circumscribed by the cylindrical protrusion 210 associated with the pocket 212. A terminal hole 216 can be formed through the base 214. Windows 220 can be formed in the base 214 and/or the cylindrical protrusions 210 to define adhesive flow paths through the top frame 104 onto the battery cells 102 positioned within the pockets 212, as explained in additional detail below.

Collars 222, 224 can be positioned about the outer perimeter of the generally rectangular base 208. The collars 222, 224 can be positioned on opposite sides of the top frame 104, and can be axially aligned with the collars 122, 124 formed on the bottom frame 106. The collars 222, 224 can each have a cylindrical inner wall 226, 228 extending from a first axial end surface 230, 232 of the collars 222, 224 to a second axial end surface 234, 236 of the collars 222, 224. The cylindrical inner walls 226, 228 each define a bore 238, 240. In some embodiments, the first axial end surface 230, 232 of each collar 222, 224 extends approximately parallel to a lowermost surface 242 of the top frame 206. The lowermost surface 242 can correspond with a lowermost surface of each cylindrical protrusion 210, for example. The first axial end surfaces 230, 232 and the lowermost surface of the top frame 104 can form a continuous planar surface.

Figure 7A:
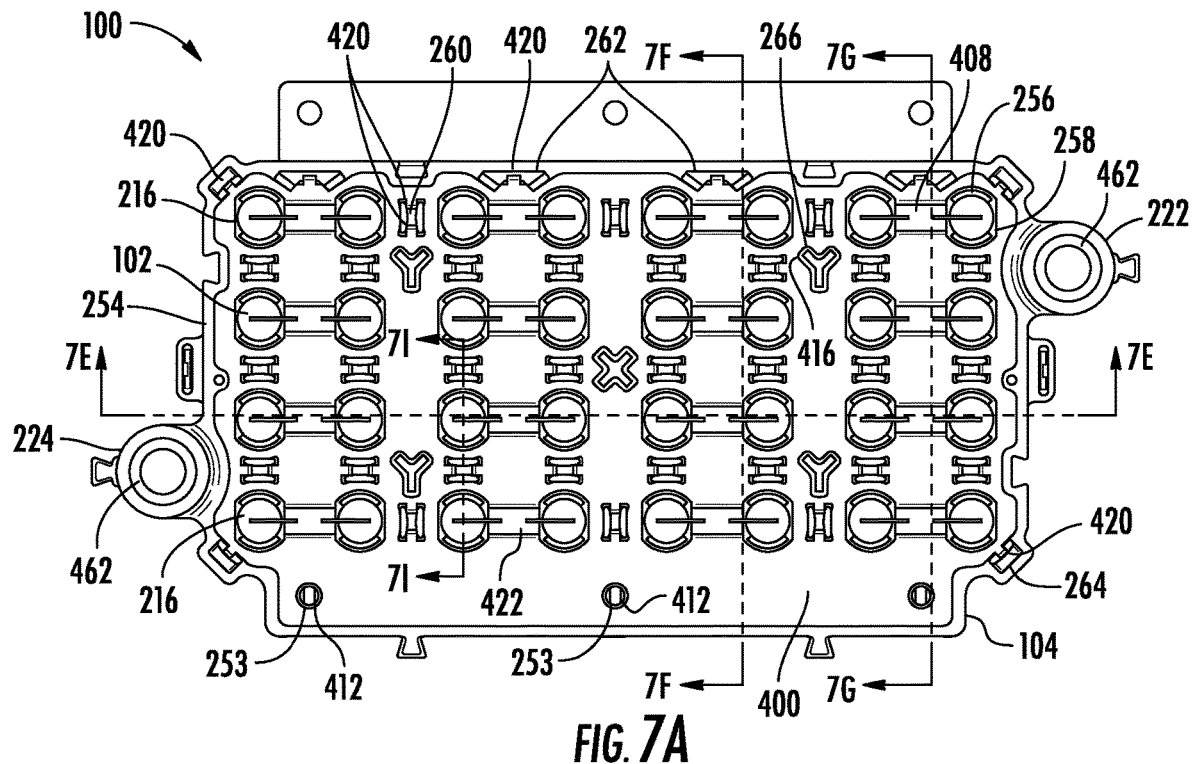
FIG. 7A is a top view of the cell module assembly of FIG. 1.

A spacer 244 can extend outward from one side of the top frame 104. Like the spacer 144, the spacer 244 extends away from an outermost set of pockets 212 to form a platform 246 having a generally planar top surface 248. Ribs 250 can extend from the cylindrical protrusions 210 outward to an outer platform surface 252 to provide additional support to the platform 246, or to provide a flange for mounting or support purposes. The platform 246 can also include through holes 251 that can receive inserts 253 (shown in FIG. 7A). The inserts 253 can be threaded, metallic components (e.g., fasteners or threaded bushings) that can be used to mount the CMA 100 within a vehicle or piece of equipment. Alternatively, the inserts 253 can receive additional conductors, which are placed in electrical communication with one or more of the battery cells 102 through the top collector plate 400, as explained below. The additional conductors coupled to the inserts 253 can extend to other CMAs 100 (e.g., to form a battery pack) or to systems on a vehicle or equipment to deliver power from the battery cells 102, for example.

Figure 5A:
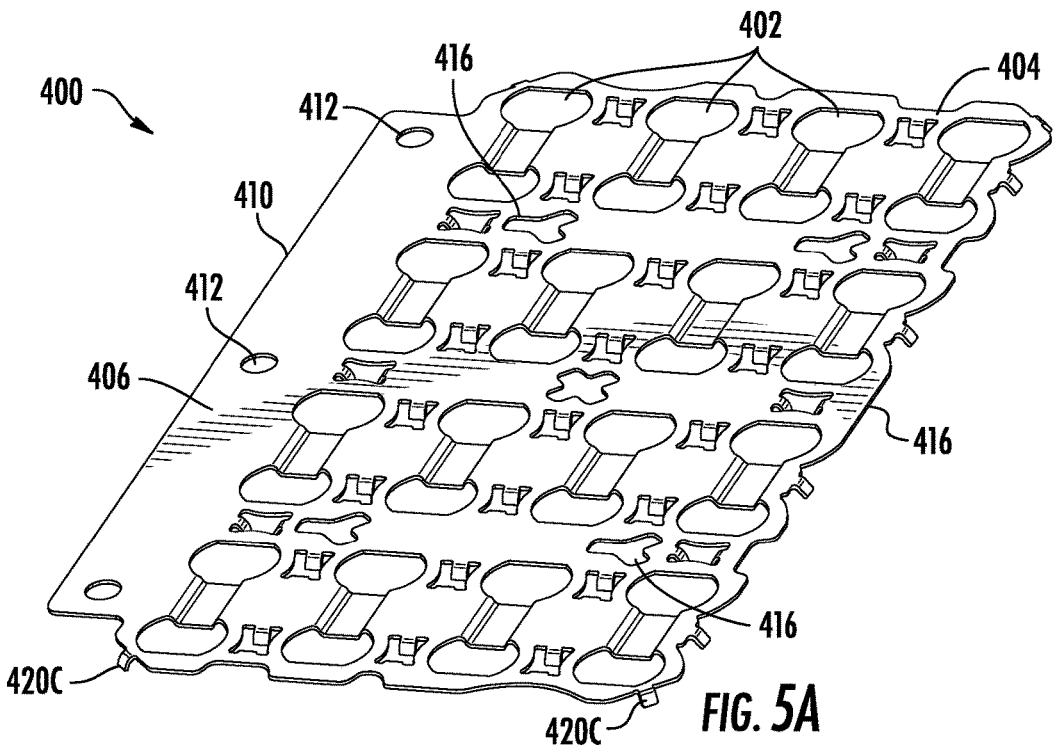
FIG. 5A is a top perspective view of a top collector plate of the cell module assembly of FIG. 1.
Figure 5B:
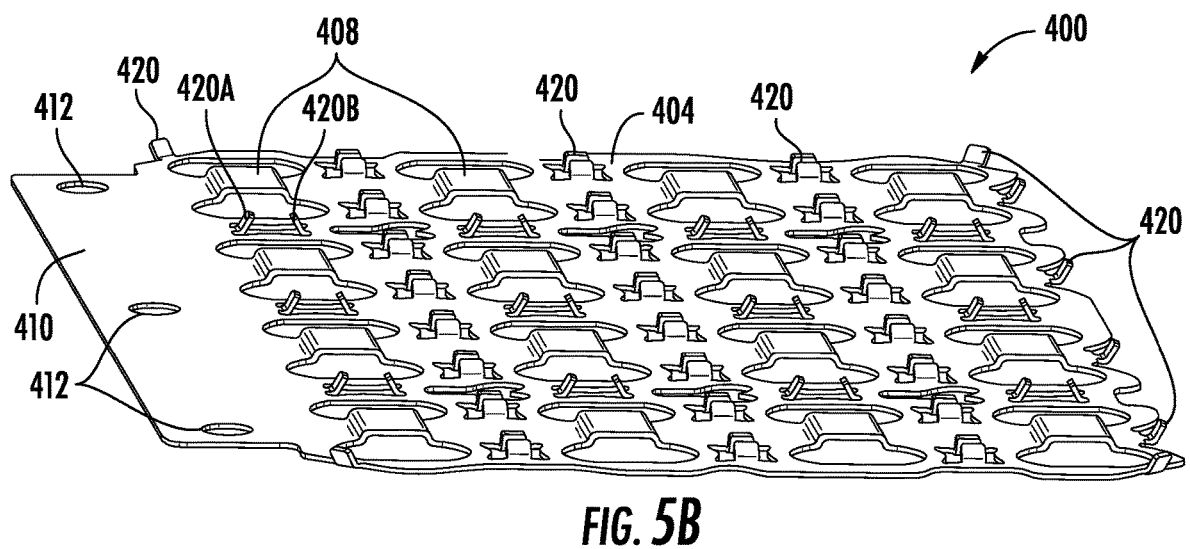
FIG. 5B is a bottom perspective view of the top collector plate of FIG. 5A.
Figure 5C:
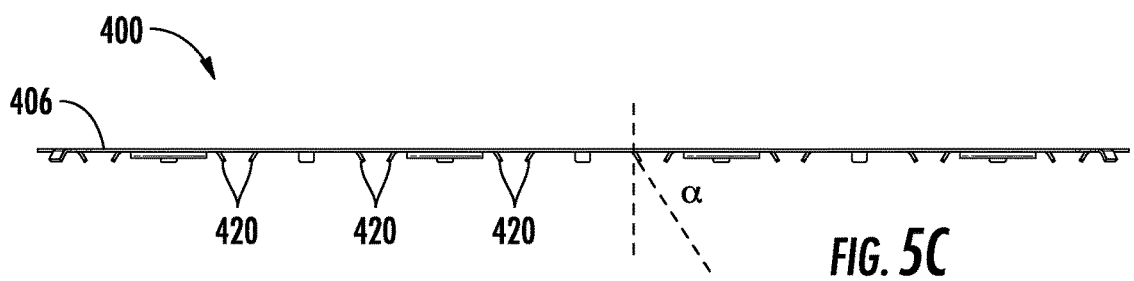
FIG. 5C is a front view of the top collector plate of FIG. 5A.

A top surface 254 of the top frame 104 can include a series of locating features 256, 258 that protrude away from the top surface 254. In some embodiments, the locating features 256, 258 are grouped in pairs of two distinct and spaced apart walls surrounding each terminal hole 216 in the bottom frame 104. The locating features 256, 258 can each have an arcuate shape defined by an identical radius, and can be positioned concentric with the terminal hole 216. The locating features 256, 258 can be used to help locate a top collector plate (400, shown in FIG. 5A-5C) and shield terminal connections between terminals of the battery cells 102 and the top collector plate 400, as explained below. In some embodiments, the locating features 256, 258 can be arranged in groups of two, and a groove 257 formed into the top surface 254 can extend between each pair of locating features 256, 258.

The top surface 254 includes recesses formed into the top frame 104 to define adhesive flow paths. The recesses can direct adhesive around battery cells 102 during the CMA assembly process (e.g., the CMA assembly process 500), which can help create a robust coupling between battery cells 102 and the top frame 104. For example, mounting holes 260 can be formed through the top frame 104. The mounting holes 260 can also be aligned to straddle two adjacent pockets 212. The mounting holes 260 can define the windows 220 formed in the cylindrical protrusions 210 and/or bases 214 discussed above. The outermost pockets 212 formed in the top frame 104 can be surrounded by additional recesses, including channels 262 and trenches 264.

One or more supports 266 can extend away from the top surface 254 of the top frame 104. The supports 266 can be spaced about the top frame 104 and positioned to more evenly distribute loading experienced by the top frame 106 (e.g., from additional CMA's, etc.) throughout the component 104. In some examples, the supports 266 extend away from the top surface 254 of the top frame 104 to a support surface 268 extending approximately planar with the second axial end surfaces 234, 236 of the collars 222, 224. The supports 266 can have one or more distinct shapes.

The top frame 104 can also include mating tabs 272 and mating notches 274 positioned about the outer perimeter of the base 208. In some examples, mating tabs 272 are formed on a first side 276 of the base 208 and extend outwardly away from the base 208, while mating notches 274 are formed into a second side 278 of the base 208 opposite the first side 276 and extend into the outer perimeter of the base 208. The mating tabs 272 and mating notches 274 can have a complimentary geometry. A third side 280 and a fourth side 282 of the top frame 104 can each include a mating tab 272 and a mating notch 274. In some embodiments, a mating tab 272 extends outwardly away from each of the collars 222, 224. In some embodiments, the mating tabs 172 and mating tabs 272 are vertically aligned. Similarly, the mating notches 174, 274 can be vertically aligned.

The battery cells 102 in the CMA 100 can be placed in electrical communication with one another using a bottom collector plate 300 and a top collector plate 400, as shown in FIGS. 4A-4C and 5A-5C respectively. The collector plates 300, 400 can be formed of an electrically conducting metallic material (e.g., copper, aluminum) that can receive and conduct current through terminals 103, 105 extending away from each battery cell 102. In some embodiments, each of the battery cells 102 includes a positive terminal 103 connected to the top collector plate 400 and a negative terminal 105 connected to the bottom collector plate 300. Conversely, each of the positive terminals 103 could be connected to the bottom collector plate 300 while each of the negative terminals 105 could be connected to the top collector plate 400.

Each of the collector plates 300, 400 include a series of apertures 302, 402 formed through a generally rectangular base 304, 404. The number of apertures 302, 402 formed through each collector plate 300, 400 can correspond to the number of battery cells 102 that are present in or that could be present in the CMA 100. The bottom collector plate 300 can be coupled to the bottom frame 106 so that each aperture is positioned below a pocket 112 of the bottom frame 106. Each aperture 302 can be aligned with (i.e., overlapping to some extent) a terminal hole 116 in the bottom frame 106. The overlapping orientation can allow a terminal 103, 105 of a battery cell 102 received within the pocket 112 to extend downward through the bottom frame 104 and the bottom collector plate 300 to make an electrical connection with a bottom surface 306 of the bottom collector plate 300. Similarly, the top collector plate 400 can be coupled to the top frame 104 so that each aperture 402 is positioned above a pocket 212 of the top frame 104. Each aperture 402 can also be aligned with a terminal hole 216 in the top frame 104 so that a terminal 103, 105 of a battery cell 102 received within a pocket 212 can extend through the top frame 104 and the base 404. The terminal 103, 105 can be bent back toward the base 104, where it can be coupled (e.g., fused) to an upper surface 406 of the top collector plate 400.

The collector plates 300, 400 each have generally complimentary geometry to seat upon the bottom frame 106 and top frame 104. For example, the apertures 302, 402 can be defined by a generally elongate oval shape that can be received around the locating features 156, 158, 256, 258. The shape of the apertures 302, 402 can form a clearance fit around the locating features 156, 158, 256, 258 to help position the collector plates 300, 400 during assembly of the CMA 100. The size and orientation of the locating features 156, 158, 256, 258 relative to the size of the apertures 302, 402 restricts movement of the collector plates 300, 400 once the collector plates 300, 400 are properly seated upon their respective frame 104, 106. Generally rectangular ridges 308, 408 formed between apertures 302, 402 can extend away from the base 304, 404 to sit upon and engage the grooves 157, 257 extending between locating features 156, 158, 256, 258. A mounting tab 310, 410 including mounting holes 312, 412 can extend outward from the base 304, 404. The mounting tab 310, 410 can extend above and sit flatly upon the platforms 146, 246, for example. In some embodiments, the mounting holes 312, 412 are used to create electrical connections with inserts 253, additional CMAs 100, equipment to be powered, negative buses, and the like. Optionally, the mounting holes 312, 412 can receive fasteners, although some embodiments of the CMA 100 omit fasteners entirely. Arms 314 can extend away from the base 304 of the bottom collector plate 300 in a direction generally perpendicular to the base 304. The arms 314 can be received within and engaged by the slots 186, for example, when the bottom collector plate 300 is properly positioned relative to the bottom frame 106. Holes 316, 416 sized to surround the supports 166, 266 extending away from each frame 104, 106 can be formed through the base 304, 404 as well.

The collector plates 300, 400 can also include a plurality of fingers 320, 420 extending away from the base 304, 404 to define adhesive passages. The fingers 320, 420 can extend from each base 304, 404 toward each respective frame 104, 106. For example, the fingers 320 can extend upwardly from the base 304 of the bottom collector plate 300 and the fingers 420 can extend downwardly away from the base 404 of the top collector plate 400.

The shape and positioning of the fingers 320, 420 relative to the bottom frame 106 and top frame 104 helps the CMA assembly process in several ways. First, the fingers 320, 420 can help secure the collector plates 300, 400 to the frames 104, 106. In some embodiments, each finger 320, 420 is positioned about the collector plate 300, 400 to engage a recess formed in the bottom frame 106 or top frame 104. The fingers 320, 420 can be arranged to extend into and engage one or more walls associated with the mounting holes 160, 260, channels 162, 262, or trenches 164, 264 to define adhesive passages extending through the top collector plate 300, 400 and into the frames 104, 106. The fingers 420 can extend downwardly and obliquely away from the top collector plate 400, which can help secure the top collector plate 400 onto the top frame 104. Similarly, the fingers 320 can extend upwardly and obliquely away from the bottom collector plate 300 to engage walls of the recesses and resist forces pulling the bottom collector plate 300 outward from the bottom frame 106. The fingers 320, 420 can include pairs of fingers 320A, 320B, 420A, 420B extending toward one another, individual fingers 320C, 420C extending outwardly from the bases 304, 404, or a combination of each, for example.

The fingers 320, 420 can also help guide adhesive into and around the pockets 112, 212 of the frames 104, 106, which can help secure battery cells 102 within the CMA 100. In some embodiments, fingers 320, 420 extend away from the bases 304, 404 and can help guide or separate adhesive flow to create multiple distinct flow paths of adhesive around and into the pockets 112, 212 when the CMA is assembled. For example, the fingers 320, 420 can extend away from the bases 304, 404 to form angles a of between about 5 degrees and about 90 degrees with the bases 304, 404. In some embodiments, the angles between the fingers 320, 420 and the bases 304, 404 are between about 20 degrees and about 80 degrees, and could be between about 50 degrees and 70 degrees. The angle of the fingers 320, 420 can be chosen based upon a viscosity of the adhesive intended to secure the collector plates 300, 400 to the bottom frame 106 and top frame 104 respectively. For example, larger angles (e.g., angles closer to 90 degrees) can be used for lower viscosity adhesives, while smaller angles (e.g., angles closer to 5 degrees) can be chosen when working with higher viscosity adhesives.

Figure 6:
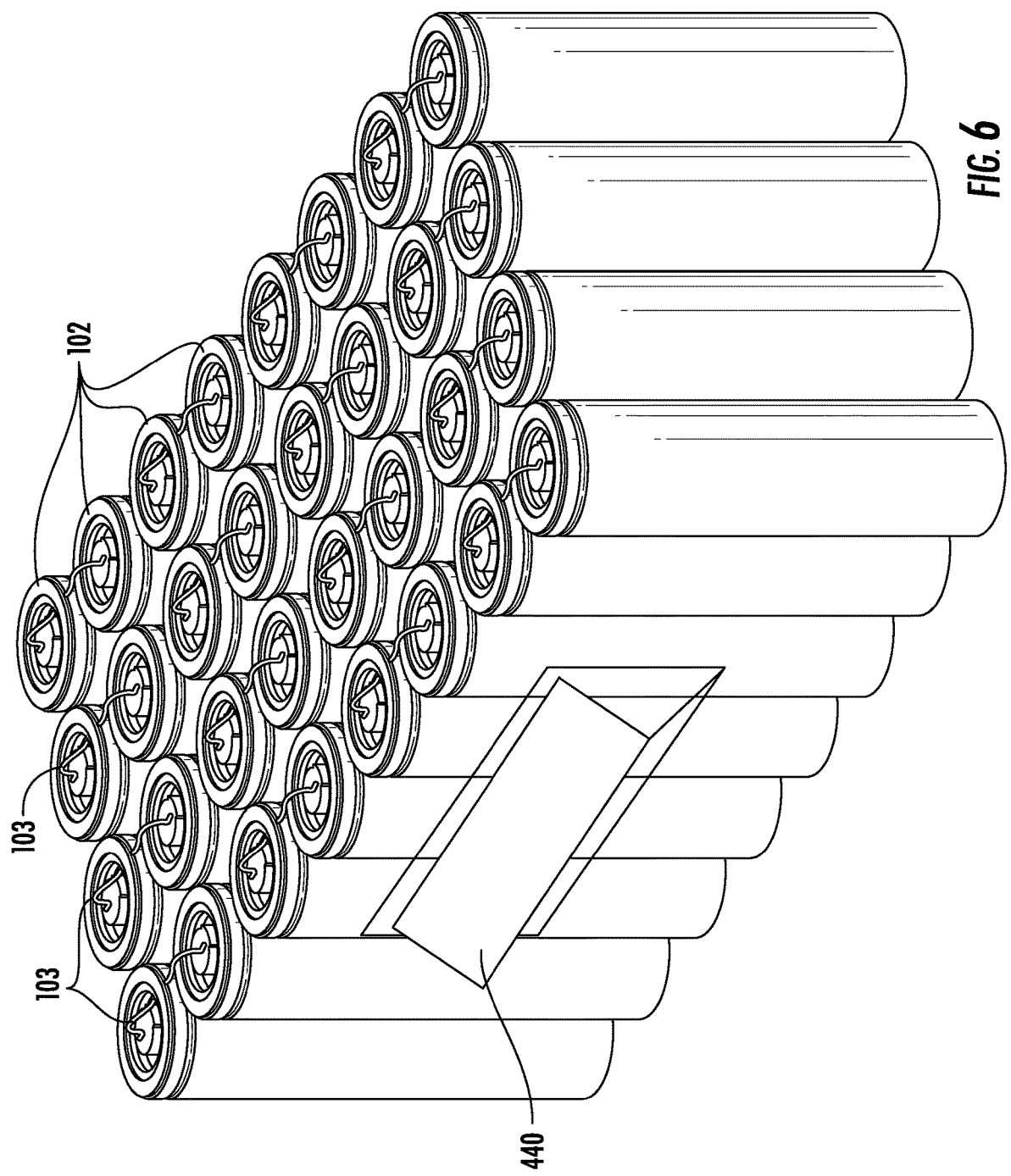
FIG. 6 is a top perspective view of an array of lithium-ion battery cells of the cell module assembly of FIG. 1.
Figure 7B:
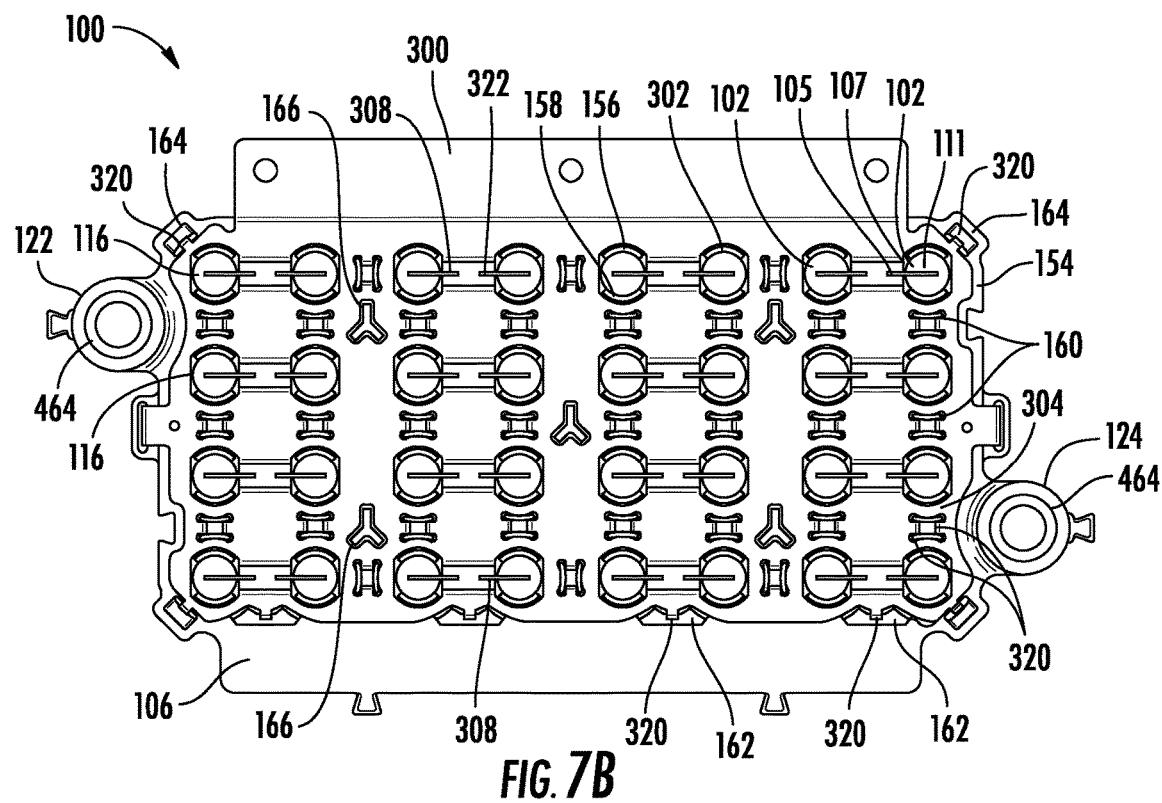
FIG. 7B is a bottom view of the cell module assembly of FIG. 1.
Figure 7C:
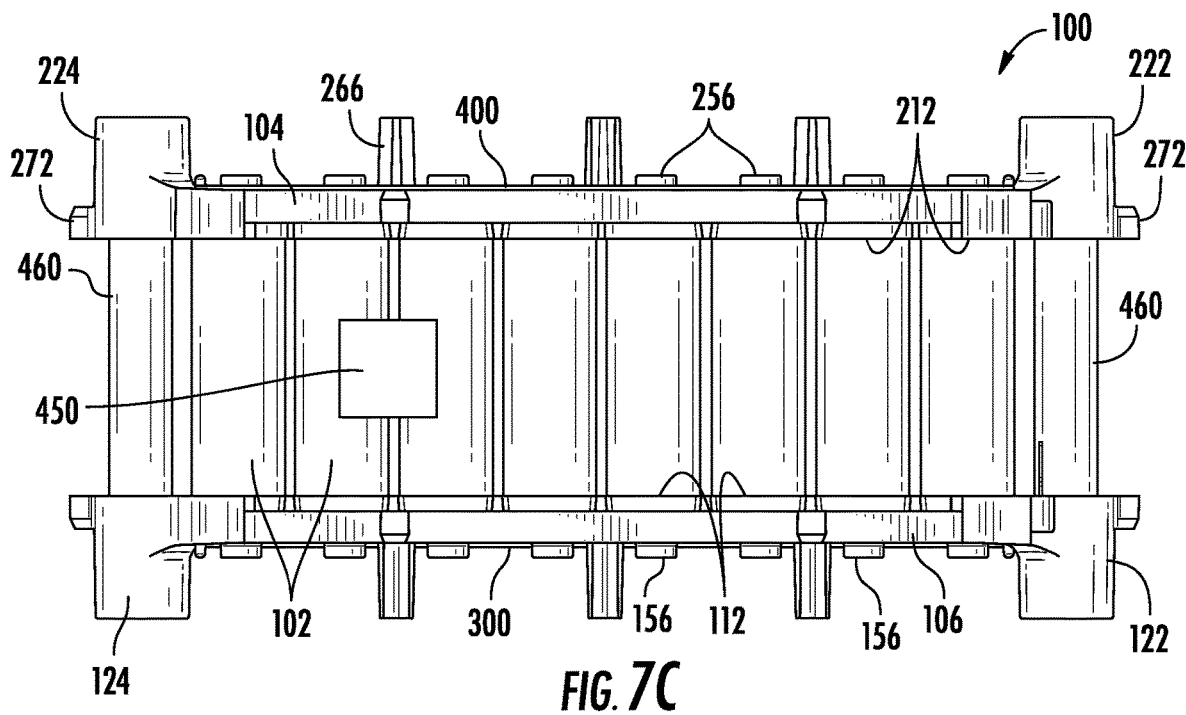
FIG. 7C is a front view of the cell module assembly of FIG. 1.
Figure 11:
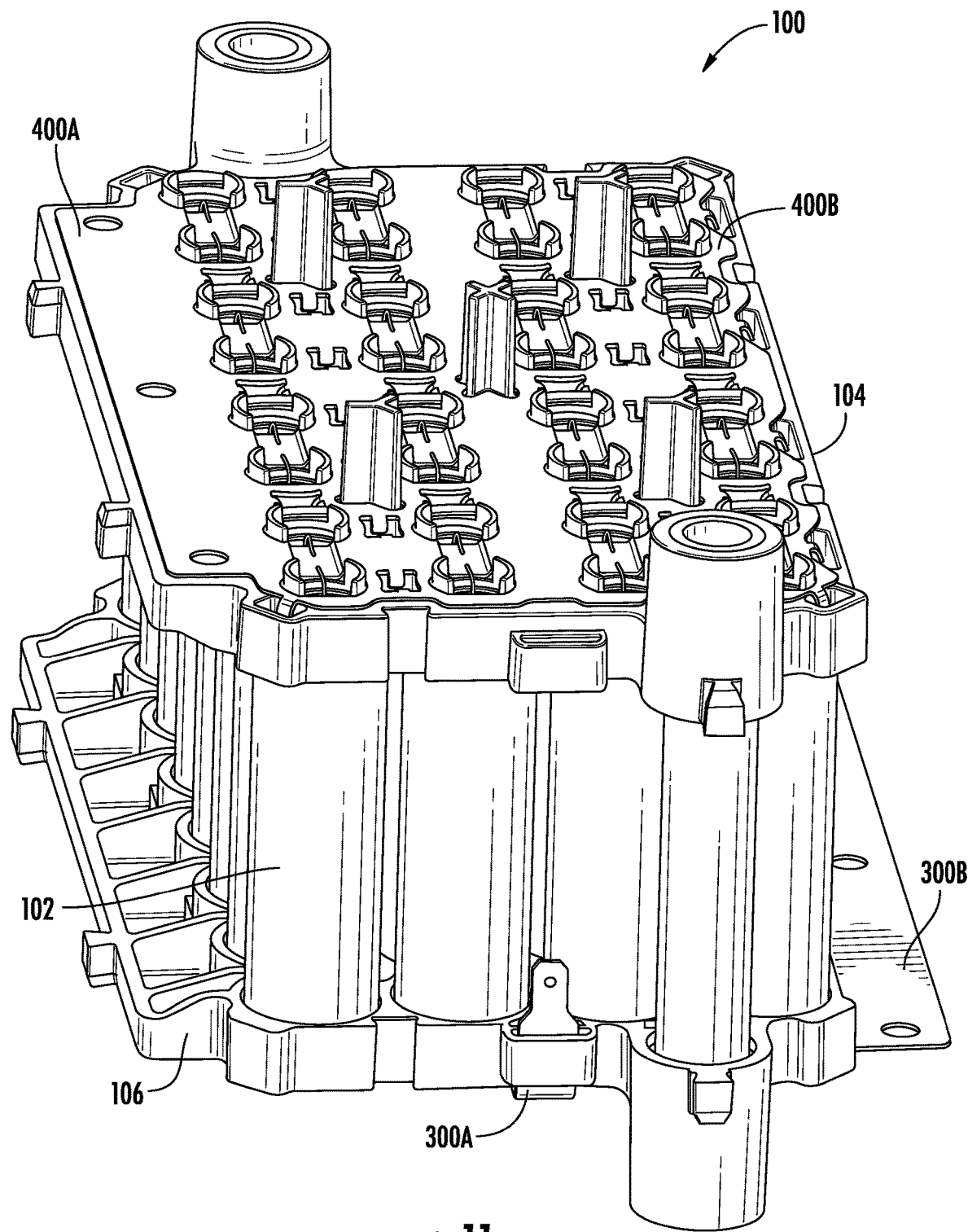
FIG. 11 is a perspective view of a cell module assembly according to other embodiments of the disclosure.

Referring now to FIG. 6, the battery cells 102 of the CMA 100 are depicted. In some embodiments, all thirty-two battery cells 102 are connected in parallel in a 1S32P (one series, thirty-two parallel) arrangement by a single top collector plate 400 and a single bottom collector plate 300. In other embodiments, two groups of sixteen battery cells 102 are connected in parallel with the two groups connected in series in a 2S16P (two series, sixteen parallel) arrangement, as shown in FIG. 11. Two top collector plates 400a, 400b and two bottom collector plates 300A, 300B can be used to connect the thirty-two battery cells 102. Each top collector plate 400A, 400A and each bottom collector plate 300A, 300B can support and connect sixteen battery cells 102 in parallel. The two sets of sixteen battery cells 102 can then be electrically coupled together (e.g., by electrically connecting the top collector plate 400A to the top collector plate 400B and electrically connecting the bottom collector plate 300A to the bottom collector plate 300B) to place the sets of sixteen battery cells 102 in series with one another. Arranging a relatively large number of battery cells 102 in parallel in this manner helps to slow the degradation of the charge capacity of the CMA 100. In other embodiments, the number of battery cells 102 in the CMA 100 may be greater or fewer and the connection arrangements between the battery cells 102 may vary depending on the ratings needed from a particular CMA (e.g., voltage, capacity, power, etc.). Each battery cell 102 can have a positive terminal 103 and a negative terminal 105, depicted in FIG. 7B.

In some embodiments, the CMA 100 also includes an electronic controller 440, as shown in FIG. 6. The electronic controller 440 can include a processor and a memory device. The processor can be implemented as a general purpose processor, an application specific integrated circuit (ASIC), one or more field programmable gate arrays (FPGAs), a group of processing components, or other suitable electronic processing components. The memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device may be or include volatile memory or non-volatile memory. The memory device may include database components, object code components, script components, or any other type of information structure for supporting the various activities and information structures described in the present application. According to an exemplary embodiment, the memory device is communicably connected to processor via processing circuit and includes computer code for executing (e.g., by processing circuit and/or processor) one or more processes described herein.

The controller 440 also implements a battery management system (BMS) for regulating the currents and/or voltages involved in the charging and discharging processes in order to ensure that the battery cells 102 are not damaged or otherwise brought to problematic charge states. For example, the BMS may block an electrical current from being delivered to the cells 102, or may block a current being drawn from the cells 102 based the current and voltage properties of the signal and/or of the CMA 100. The BMS may also implement controls based a temperature as detected by a temperature sensor and regulate operation of the CMA 100 based on over temperature or under temperature conditions determined by the detected temperature.

The maximum charge capacity of the cells 102 of the CMAs 100 of a battery pack decay of over the life of the battery pack as the battery pack ages. This decay is caused by the battery pack being cycled by discharging and then recharging the battery pack, changes in temperature (e.g., high temperatures), and degradation of the chemistry of the battery cells. A cycle is the transition from the battery pack's fully charged state (as allowed by the BMS) to its fully discharged state (as allowed by the BMS). As the number of cycles increases over the life of the battery pack, the battery pack's maximum charge capacity declines.

The electronic controller 440 of each CMA 100, if present, can be programmed to store data related to the operation of that CMA 100 and to use that data to determine a useful life measurement for that CMA 100. The useful life measurement may be expressed in terms of a percentage of life (e.g., the CMA is at 100% life when brand new). The useful life measurement may be used to set multiple end of life thresholds tied to certain applications for the CMA. For example, a CMA 100's first life could extend between 100% and 70% charge capacity where the CMA 100 would be suitable for use powering a commercial lawn mower. After the end of the first life (e.g., a useful life measurement below 70%), a CMA 100 could be reconditioned and put to use in its second life (e.g., between 70% and 50%) in which the CMA 100 is suitable for use in a battery pack for equipment having lower energy requirements than the equipment powered by the CMA 100 during its first life.

The useful life measurement can be determined by a number of data points indicative of useful life that can be monitored and saved by the electronic controller 440. These useful life indicators include charge capacity, days or other time elapsed since a commissioning date when the CMA 100 is first put into service, number of cycles since the commissioning date, depth of cycle for individual cycles or groups of cycles, an electrical charge tracker that counts the number of coulombs supplied by the CMA 100 since the commission date, an event counter of operation of the CMA 100 in extreme temperature conditions (e.g., above 140 degrees Fahrenheit) for individual events or groups of events, the current supplied by the CMA 100, the current received by the CMA 100 for charging, the voltage supplied by the CMA 100, and/or the voltage applied to the CMA 100 during charging. In different embodiments, different combinations of useful life indicators are monitored and saved by the electronic controller 440. The useful life indicators identified above may be monitored individually in some embodiments or monitored in any combination in other embodiments. In other embodiments, useful life indicators are tracked and stored for each individual battery cell 102 of the CMA 100.

Gathering and tracking useful life indicators across the life of the CMA rather than a single instantaneous reading indicative of the end of life (e.g., 70% charging capacity) provides additional information to classify a CMA 100 for reconditioning to an appropriate use. In some embodiments, not every data point associated with a useful life indicator is stored, for example temperature may be sampled and stored on a weekly basis rather than daily basis. CMAs 100 may be classified where different classifications are suitable for use in different second lives or based on different expected future performance in the second life as determined by the evaluation of the useful life indicators from the first life. Tracking useful life indicators also provides the CMA manufacturer with data that can be used for diagnostics to determine why a particular CMA performs better or worse than a similar CMA and then use that diagnostic information to improve manufacturing or other processes for new CMAs.

For example, a CMA 100 with 70% charging capacity, but a relatively high number of days operated in extreme temperature conditions may have is charging capacity degrade at a faster rate than a CMA 100 with a 70% charging capacity and no days operated in extreme temperature conditions. Both CMAs 100 may be suitable for reconditioning and use in their second lives, but the appropriate uses for the two CMAs in their second lives may be different based on their classification resulting from evaluation of their respective useful indicators. Tracking and storage of useful life indicators can also be used to evaluate returned or warrantied battery packs, fix or refurbish battery packs returned within their first life, and improve manufacturing processes by comparing various CMAs to one another.

The useful life indicators are used to identify when a CMA 100 has reached an end of life threshold. The CMA 100 may have multiple end of life thresholds. For example, the CMA 100 may be suitable for use in a first application during the span of its first life (e.g., a commercial lawn mower). When the CMA 100 reaches its first end of life threshold (e.g., 80%, 75%, 70%, etc. of its useful life), the CMA 100 is taken out of service for the first application and returned to the CMA manufacturer. The CMA manufacture then categorizes or classifies the CMA 100 based on its useful life data to identify a suitable second life application for that particular CMA 100. If necessary, that CMA 100 is reconditioned or refurbished and then combined with other similarly classified CMAs to form a battery pack for use in a second life application. This new battery pack can be used in the second life application until the CMA reaches a second end of life threshold (e.g., 50%, 45%, 40%, etc. of its useful life). This method of using the same CMA for different applications based on the CMA's life cycle allows the CMA manufacturer to make more complete use of the CMA's available capacity by using the CMA in multiple applications rather than having a CMA at the end of its first life discarded and not make use of the remaining battery capacity.

The CMA manufacturer may lease battery packs consisting of multiple CMAs to the user of the equipment powered by the battery pack. This approach would enable the user of the CMA during its first life to return the battery pack at the end of its first life to the CMA manufacturer, allowing the CMA manufacturer to classify the CMAs and reuse them for second life applications, where the resulting battery packs could again be leased or sold to the user of the equipment powered by the battery pack consisting of CMAS in their second life. Alternatively, the CMA manufacture can sell the battery packs consisting of CMAs and buy back the battery packs at the end of the first life of the CMAs for classification and reuse in a second life application.

Figure 8:
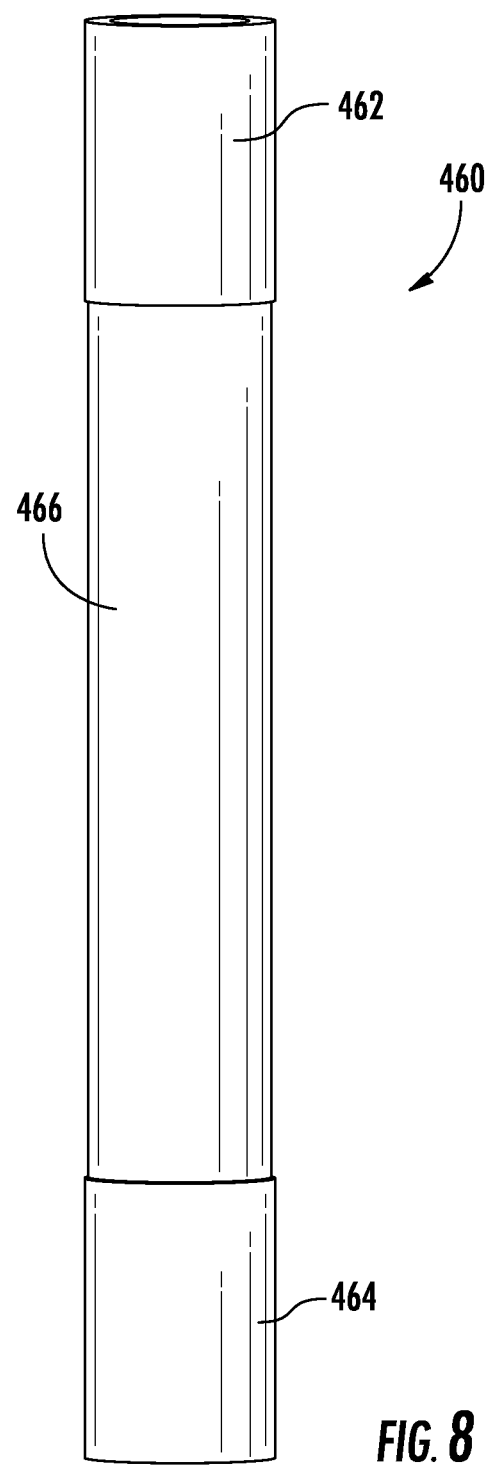
FIG. 8 is a perspective view of a compression limiter of the cell module assembly of FIG. 1.
Figure 9:
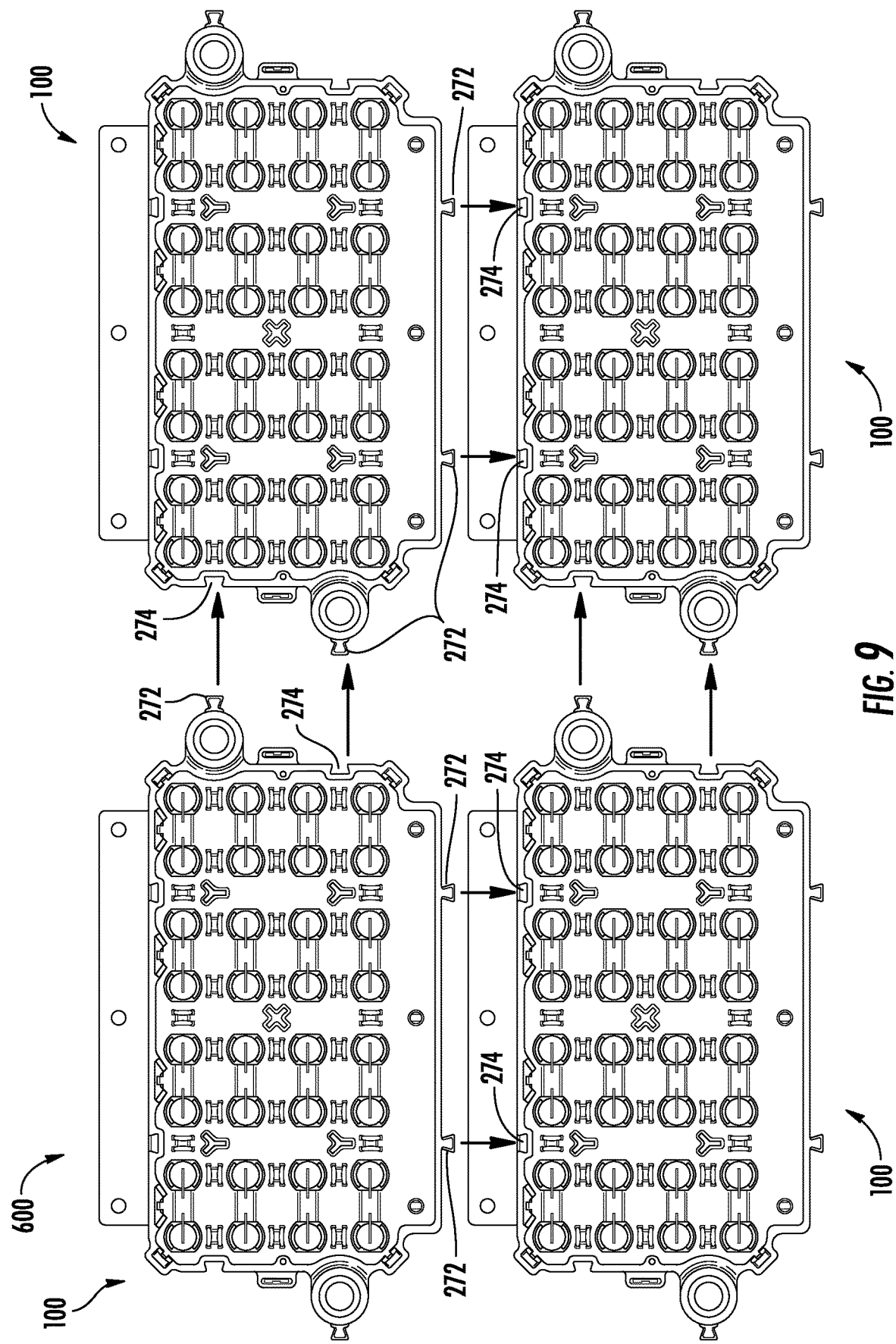
FIG. 9 is a top view of multiple cell module assemblies as depicted in FIG. 1, detailing where mating features formed on each cell module assembly can be coupled together to form a battery pack.
Figure 10:
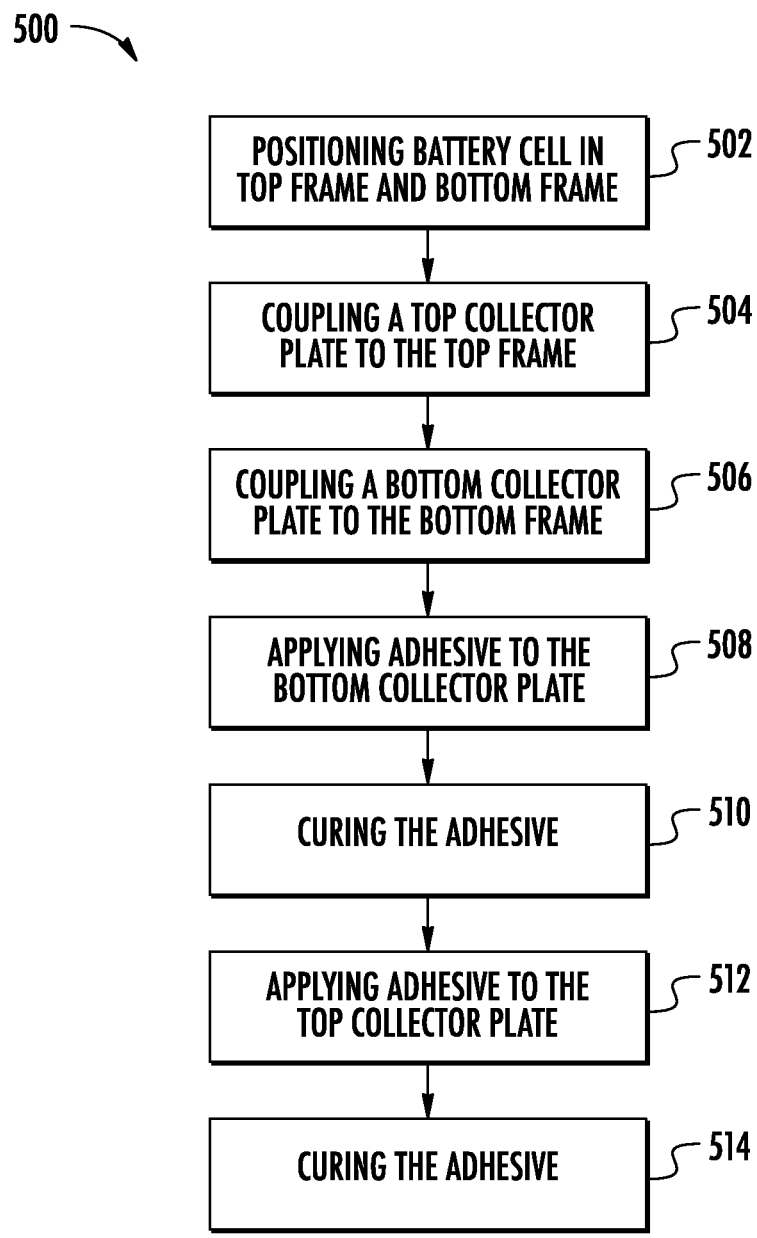
FIG. 10 is a process diagram depicting a method of assembling a cell module assembly, such as the cell module assembly of FIG. 1.

The CMA 100 can be assembled using a process 500 illustrated in FIG. 10, with reference to each of FIGS. 1-9 and 11. Initially, the top frame 104 and bottom frame 106 are provided. As indicated above, the top frame 104 and the bottom frame 106 can each be injection molded polymeric components. In some embodiments, the top frame 104 and bottom frame 106 are each formed of electrically insulating materials.

At step 502, battery cells 102 are positioned in each pocket 112, 212 formed in the top and bottom frames 104, 106. The pockets 212 in the top frame 104 can be axially aligned with the pockets 112 in the bottom frame 106, so that each cylindrical battery cell 102 can be simultaneously received within both pockets 112, 212. The battery cells 102 can abut the bases 114, 214 of each pocket, and can include terminals 103, 105 extending through each of the terminal holes 116, 216 formed through the bottom frame 106 and top frame 104 respectively.

During step 502, one or more compression limiters 460, shown in FIG. 8, can be placed within the collars 122, 124, 222, 224 formed in the bottom frame 106 and top frame 104. The compression limiters 460 can have a generally tubular shape defined by a cylindrical outer surface 466 having widened sections 462, 464 formed at each axial end of the compression limiter 460. The collars 122, 124 on the bottom frame 106 can be axially aligned with the collars 222, 224 on the top frame 104, so that each compression limiter 460 extends between two collars.

The compression limiters 460 can be defined by a height (i.e., a longitudinal length) that is larger than a height of each battery cell 102. By being taller than the battery cells 102, compressive loading experienced by either of the frames 104, 106 is initially diverted to the compression limiters 460, which engage the collars 122, 124, 222, 224. The compression limiters 460 keep the bottom frame 106 and the top frame 104 at a fixed distance apart from one another, which prevents the frames 104, 106 from applying extreme or otherwise unwanted compressive stress to each battery cell 102 that could be caused by loading from another CMA positioned above the CMA 100, for example.

At step 504, the top collector plate 400 is coupled to the top frame 104. The top collector plate 400 can be positioned above the top frame 104, then urged downward until the base 404 of the top collector plate 400 engages the top surface 254 of the top frame 104. Once properly seated upon the top frame 104, locating features 256, 258 extend through each aperture 402, ridges 408 extend into each groove 257 in the top frame 104, and supports 266 extend through each hole 416. Fingers 420 of the top collector plate 400 extend downwardly into recesses in the top frame 104, including the mounting holes 260, the channels 262, and the trenches 264. The fingers 420 can engage outer surfaces of each recess to resist forces attempting to pull the top collector plate 400 apart from the top frame 104 once it has been engaged. Optionally, inserts 253 can be installed into the mounting holes 412 and through holes 251.

At step 506, the bottom collector plate 300 is coupled to the bottom frame 106. The bottom collector plate 300 is first positioned below the bottom frame 106, then urged upward until the base 304 of the bottom collector plate 300 engages the bottom surface 154 of the bottom frame 106. Alternatively, the CMA 100 can be flipped upside down, and the bottom collector plate 300 can be positioned above the bottom frame 106, then urged downward until the base 304 of the bottom collector plate 300 engages the bottom surface 154 of the bottom frame. Once properly seated upon the bottom frame 106, locating features 156, 158 extend through each aperture 302, ridges 308 extend into and engage each groove 157 in the bottom frame 106, and supports 166 extend through each hole 316. Fingers 320 of the bottom collector plate 300 extend upwardly (or downwardly, if the CMA 100 has been flipped) into recesses in the bottom frame 106, including the mounting holes 160, the channels 162, and the trenches 164. The fingers 320 can engage outer surfaces of each recess to resist any removing the bottom collector plate 300 from the bottom frame 106 once the components are engaged. Although steps 504 and 506 are described as happening in succession, step 506 and even steps 508 and 510, discussed below, can occur prior to step 504.

At step 508, adhesive is applied to the CMA 100 to rigidly couple the bottom collector plate 300 and the bottom frame 106 to each battery cell 102 in the CMA 100. Before applying adhesive, the frames 104, 106 can be clamped together using the compression limiters 460. Adhesive (e.g., glue) can first be applied to the top collector plate 400. If the CMA 100 remains upside down, adhesive is first applied to the bottom collector plate 300 above each recess (e.g., mounting holes 160, channels 162, trenches 164) formed in the bottom frame 106. The fingers 320 extending into each recess can separate and shape the adhesive flow inward, into the pockets 112 and onto the battery cells 102 received in the pockets 112. The positioning of the recesses directs adhesive into each pocket 112 and toward each battery cell 102 in at least two (and in some cases three) directions, each of which are spaced apart from one another angularly about each battery cell 102 by at least about 90 degrees. The angle of adhesive introduction can be different depending on the location of the battery cell 102 within the array. The adhesive can be introduced into the pockets 112 in directions approximately normal to each battery cell 102. The adhesive continues to flow downward, through the recesses and along the outer surfaces of the battery cells 102.

At step 510, the adhesive is cured. In some embodiments, the adhesive can be cured by exposing the CMA to ultraviolet (UV) light for a predetermined time period. The adhesive, generally, can be a glue or epoxy that sets or cures rapidly when exposed to stimuli, such as UV light, ozone gas, or other reactants. Once the adhesive has cured, rigid couplings are formed between each of the bottom collector plate 300 and the bottom frame 106 and the bottom frame 106 and each battery cell 102. The rotational orientation of each battery cell 102 is rigid and secured by the at least two points of adhesive contact formed on each end of the battery cell 102.

At step 512, the CMA 100 is flipped over, such that the top frame 104 and top collector plate 400 face upward. Adhesive can then be applied to the top collector plate 400. In some embodiments, adhesive is applied to the top collector plate 400 above each recess (e.g., mounting holes 260, channels 262, trenches 264) formed in the top frame 104. The fingers 420 extending into each recess can separate and shape the adhesive flow inward, into the pockets 212 and onto the battery cells 102 received in the pockets 212, along the adhesive flow paths 430 shown in FIGS. 7D-7I. The positioning of the recesses directs adhesive into each pocket 212 and toward each battery cell 102 in at least two directions, each of which are spaced apart from one another angularly about each battery cell 102 by at least about 90 degrees. The angle of adhesive introduction can be different depending on the location of the battery cell 102 within the array. The adhesive can be introduced into the pockets 212 in directions approximately normal to each battery cell 102. The adhesive continues to flow downward, through the recesses and along the outer surfaces of the battery cells 102.

Figure 7D:
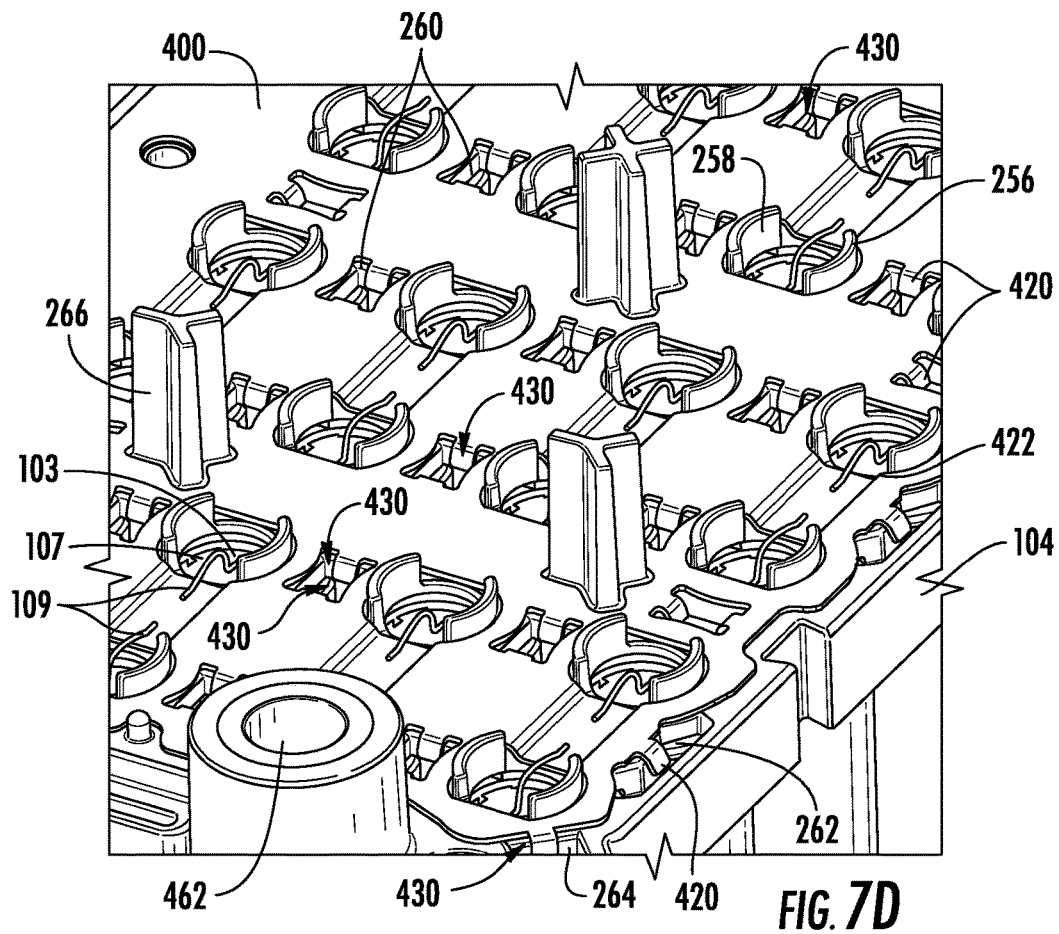
FIG. 7D is a detailed top perspective view of the cell module assembly of FIG. 1, showing interactions between the top frame of FIG. 3A and the top collector plate of FIG. 5A.
Figure 7E:
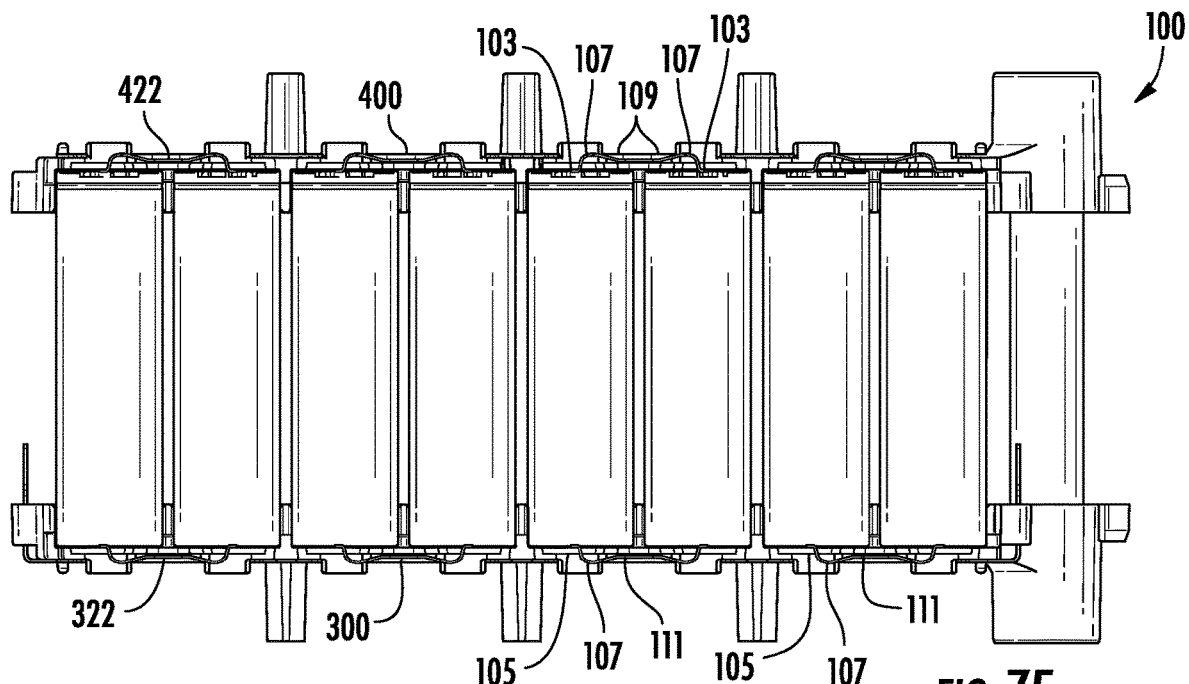
FIG. 7E is a cross-sectional view of the cell module assembly of FIG. 1, taken along line 7E-7E in FIG. 7A.
Figure 7F:
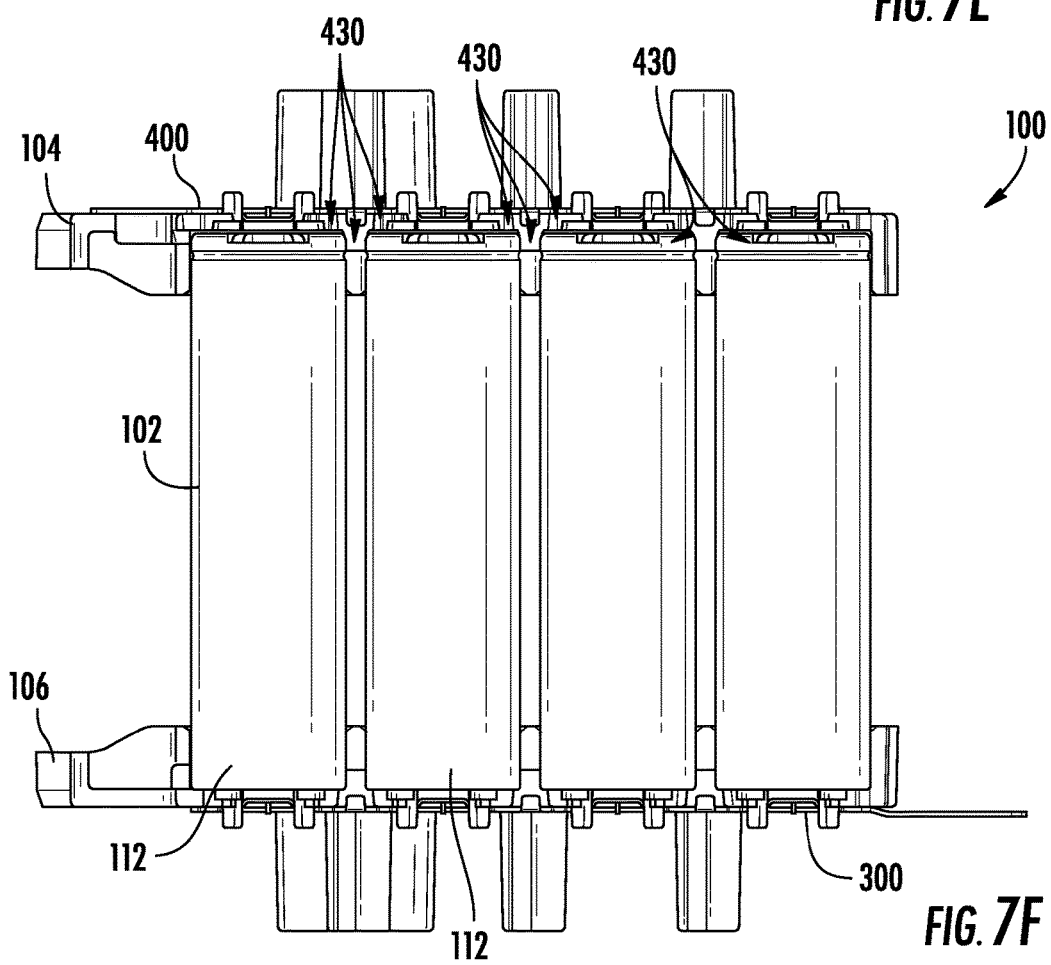
FIG. 7F is a cross-sectional view of the cell module assembly of FIG. 1, taken along line 7F-7F in FIG. 7A.
Figure 7G:
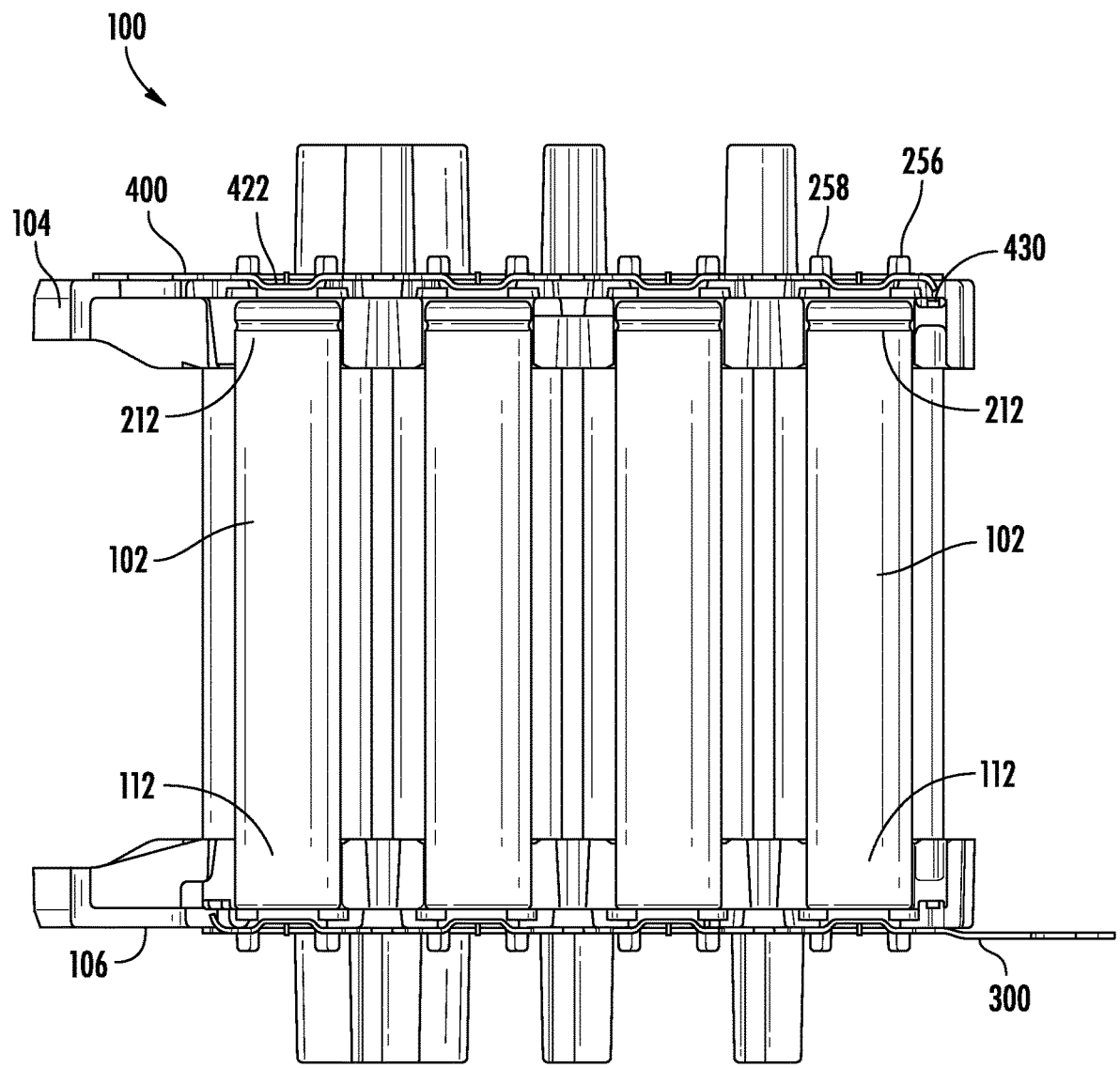
FIG. 7G is a cross-sectional view of the cell module assembly of FIG. 1, taken along line 7G-7G in FIG. 7A.
Figure 7H:
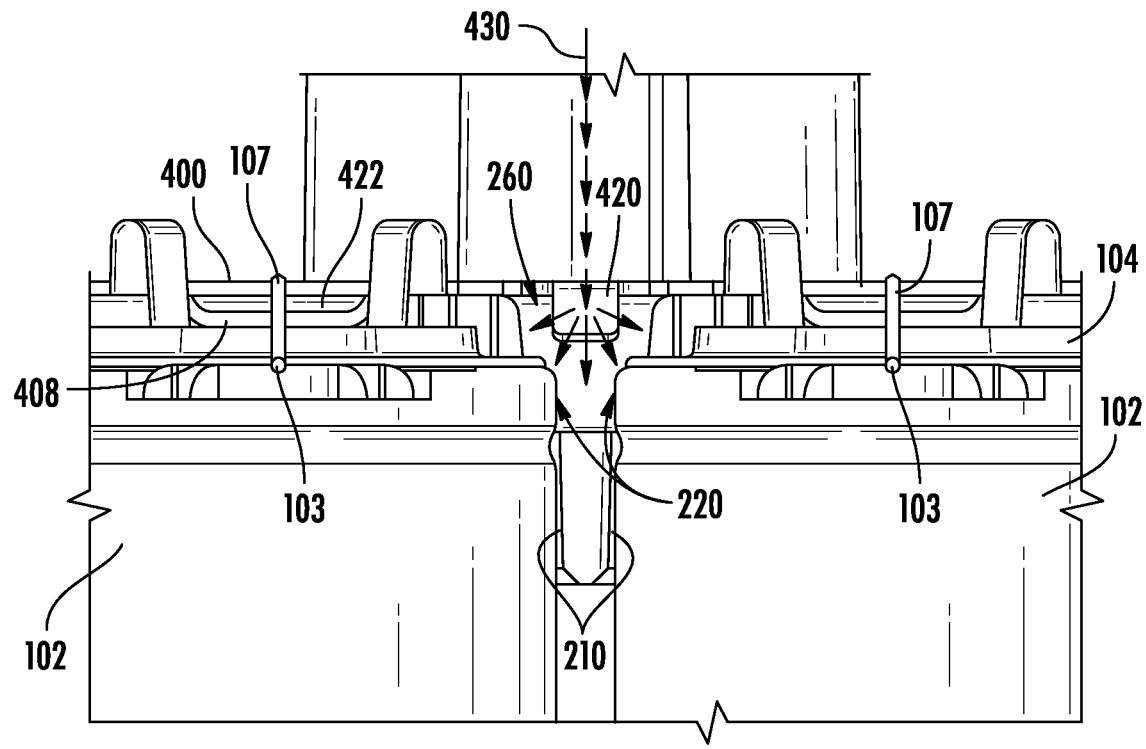
FIG. 7H is a detail view of the cross-sectional view of FIG. 7F.
Figure 7I:
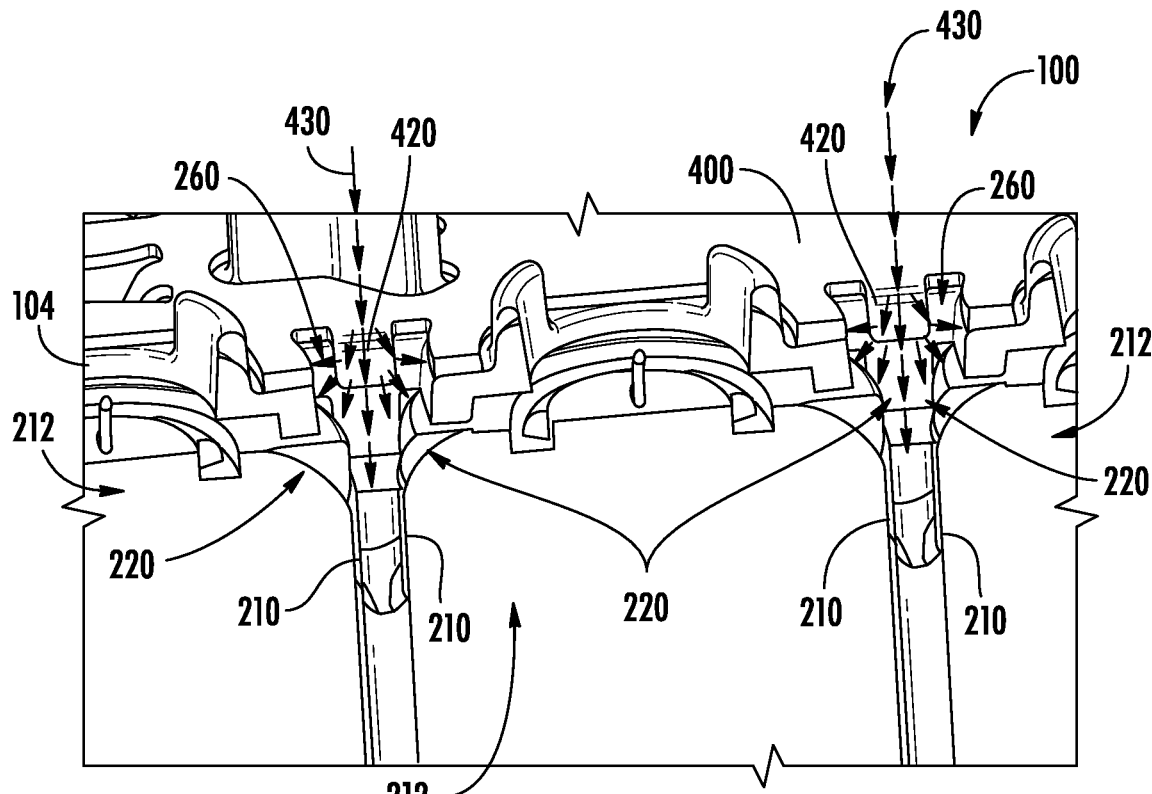
FIG. 7I is a perspective view of a cross-section of the cell module assembly of FIG. 1, taken along lines 7I-7I in FIG. 7A.

FIGS. 7H and 7I depict the adhesive path 430 through mounting holes 260 that creates multiple points of adhesive contact with each battery cell 102. Adhesive is supplied to the top collector plate 400 above each recess in the top frame 104, including each mounting hole 260. As the adhesive approaches the top frame 104, it can first be contacted by the one or more fingers 420 extending from the top collector plate 400 into the mounting hole 260. The fingers 420 shape the adhesive flow by directing flow outward, toward the battery cells 102 positioned on either side of the finger 420. The windows 220 formed in each cylindrical protrusion 210 create a flow path for adhesive to travel toward and into each pocket 212 to contact the battery cell 102. Adhesive within the mounting hole 260 can then contact each of the battery cell 102, top frame 104, and top collector plate 400 (at the finger 420, for example) simultaneously. The fingers 420 can be enlarged or angled to provide additional anchoring of the top collector plate 400 to the top frame 104. As multiple (at least two, and sometimes three) windows 220 exist in each pocket, every battery cell is contacted by adhesive in at least two different directions, each of which are at least 45 degrees and preferably 90 degrees offset from one another.

At step 514, the adhesive is cured. Once again, the adhesive can be cured by exposing the CMA to ultraviolet (UV) light for a predetermined time period. The adhesive, generally, can be a glue or epoxy that sets or cures rapidly when exposed to stimuli, such as UV light, ozone gas, or other reactants. Once the adhesive has cured in step 514, rigid couplings are formed between each of the bottom collector plate 300 and the bottom frame 106 and the bottom frame 106 and each battery cell 102. The rotational orientation of each battery cell 102 is rigid and secured by the at least two points of adhesive contact formed on each end of the battery cell 102. The layout of each frame 104, 106, collector plate 300, 400, and battery cell 102 produces a CMA 100 that can be built entirely without metal fasteners. Fasteners can create numerous problems during conventional battery assembly when they are dropped between battery cells or make electrical contact with other current conducting features, and eliminating the need for fasteners within battery assemblies can improve assembly efficiency.

Once the adhesive has cured, electrical connections can be made within the CMA 100. For example, each terminal 103 of the conducting wires 107 can be coupled to a battery cell 102 and each terminal 109 can be coupled to the top collector plate 400 using wire bonding.

Similarly, each terminal 105 can be coupled to the bottom collector plate 300 and each terminal 111 can be coupled to a battery cell 102 using wire bonding. The terminal connections can occur within troughs 322, 422 formed behind each ridge 308, 408 in the collector plates 300, 400. The troughs 322, 422 can be sunken into the collector plates 300, 400. In some embodiments, two terminals 103, 105 are coupled to the collector plate 300, 400 within a common trough 322, 422, as shown in FIG. 7D. The troughs 322, 422, along with the locating features 156, 158, 256, 258 surround and protect the terminals 103, 105 from damage. The troughs 322, 422 also reduce the amount of bending needed to couple each terminal 103, 105 to the collector plates 300, 400, which improves battery efficiency by reducing the amount of resistance in each terminal 103, 105 and allowing more current to pass through each terminal 103, 105. In some embodiments, a chemical fuse or a semiconductor fuse 450, shown in FIG. 7C, can be coupled to the CMA 100 to provide additional safety in the event of a short circuit. The fuse 450 is selected so that it breaks the electrical circuit at a fuse threshold current below a wire bond threshold current, so that the fuse 450 is activated and breaks the electrical circuit before the wire bonds 107 melt or otherwise fail due to an overcurrent condition. The controller 460 including the BMS can also be coupled to at least one of the battery cells 102 in the CMA 100 (e.g., with one of the collector plates 300, 400 or one of the inserts 253). The CMA 100 can then be used individually or in a battery pack to provide electrical power to a vehicle or other equipment.

Once the CMA 100 is fully assembled, a battery pack 600 of several CMAs 100 can be created. As shown in FIG. 9, mating tabs 172, 272 and mating notches 174, 274 formed on each of the top frames 104 and the bottom frames 106 can be coupled together to create a battery pack 600. As shown, CMAs 100 can be coupled together on all four sides of the CMA 100, which allows for unique battery pack builds suitable for specific applications. CMAs 100 can also be stacked vertically, where supports 166, 266 and collars 122, 124, 222, 224 engage and support one another on adjacent CMAs 100. The spacers 144, 244 that can be present in each of the top frame 104 and bottom frame 106 can improve airflow within the battery pack 600, which may prevent overheating. Each CMA 100 can be electrically combined with additional CMAs 100 by using conductors extending between top or bottom collector plates 400, 300 of adjacent batteries. In some examples, each bottom collector plate 300 is electrically coupled to a negative bus (not shown) while each top collector plate 400 is electrically coupled to at least one adjacent CMA 100. At least one of the CMAs 100 in the battery pack 600 can include a conductor outputting electrical power to a vehicle, a system, or equipment.

The modular mating features of the CMAs 100 enable users to customize a battery pack suitable for a particular end use. The number of CMAs 100 needed, how the CMAs 100 are connected to each other, and the available physical space (e.g., volume or footprint) for the battery pack can all be factored in to design a customized battery pack that can be built substantially cheaper than current methods allow. The CMA 100 can serve as a single unit "building block" for assembling battery packs with different ratings and of different sizes for use in particular applications. This flexibility allows a battery pack to be customized for its particular application while using the same CMA building block across multiple battery pack applications. Each battery pack may be identified with an individual identifier (e.g., serial number, bar code, etc.) for use by the CMA manufacturer to track, categorize, evaluate, or record information or data about an individual battery pack and the particular CMAs used in that battery pack.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims. It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples). The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, obj ect code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein. The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A cell module assembly, comprising:
   a first frame defining a first plurality of pockets, the first frame including a first collar extending outwardly from an outer perimeter of the first frame;
   a second frame spaced apart from the first frame and defining a second plurality of pockets, the second frame including a second collar extending outwardly from an outer perimeter of the second frame, the first collar being axially aligned with the second collar;
   a plurality of lithium-ion battery cells coupled to and extending between the second frame and the first frame, each one of the plurality of lithium-ion battery cells is received within a respective one of the first plurality of pockets and a respective one of the second plurality of pockets;
   a first collector plate electrically connected to the plurality of lithium-ion battery cells and coupled to the first frame;
   a second collector plate electrically connected to the plurality of lithium-ion battery cells and coupled to the second frame; and
   a compression rod received within and extending between the first collar and the second collar, wherein the first frame includes a plurality of mounting holes that each extend through the first frame and connect two adjacent pockets in the first plurality of pockets, and wherein a curable adhesive is arranged within and extends through the plurality of mounting holes to contact each of the plurality of lithium-ion battery cells in at least two separate locations.

2. The cell module assembly of claim 1, wherein a third collar is formed on the outer perimeter of the first frame opposite the first collar, and wherein a fourth collar is formed on the outer perimeter of the second frame opposite the second collar, the third collar and the fourth collar being axially aligned and receiving a second compression rod extending therebetween.

3. The cell module assembly of claim 1, wherein the compression rod defines an axial height that is larger than an axial height defined by the plurality of lithium-ion battery cells.

4. The cell module assembly of claim 1, wherein the compression rod defines a diameter smaller than a diameter of the plurality of lithium-ion battery cells.

5. The cell module assembly of claim 1, wherein the first frame includes an outer perimeter having one or more mating tabs extending outwardly from the outer perimeter and one or more mating notches extending inwardly into the outer perimeter.

6. The cell module assembly of claim 5, wherein the one or more mating tabs and the one or more mating notches are complimentary.

7. The cell module assembly of claim 5, wherein an outer perimeter of the second frame includes one or more mating tabs extending outwardly from the outer perimeter and one or more mating notches extending inwardly into the outer perimeter.

8. The cell module assembly of claim 5, wherein each of the one or more mating tabs tapers outwardly as it extends away from the outer perimeter of the first frame.

\* \* \* \* \*